(12) United States Patent
Moskovich et al.

(10) Patent No.: US 11,582,256 B2
(45) Date of Patent: Feb. 14, 2023

(54) DETERMINING MULTIPLE WAYS FOR COMPROMISING A NETWORK NODE IN A PENETRATION TESTING CAMPAIGN

(71) Applicant: XM Cyber Ltd., Hertsliya (IL)

(72) Inventors: Yarden Moskovich, Kiryat Ata (IL); Ronen Segal, Hertzliya (IL); Boaz Gorodissky, Hod-Hasharon (IL)

(73) Assignee: XM Cyber Ltd., Hertsliya (IL)

( * ) Notice: Subject to any disclaimer, the term of this patent is extended or adjusted under 35 U.S.C. 154(b) by 285 days.

(21) Appl. No.: 17/098,541

(22) Filed: Nov. 16, 2020

(65) Prior Publication Data

US 2021/0314341 A1 Oct. 7, 2021

Related U.S. Application Data

(60) Provisional application No. 63/005,515, filed on Apr. 6, 2020.

(51) Int. Cl.
*H04L 9/40* (2022.01)
*H04L 43/06* (2022.01)

(52) U.S. Cl.
CPC .......... *H04L 63/1433* (2013.01); *H04L 43/06* (2013.01); *H04L 63/1416* (2013.01);
(Continued)

(58) Field of Classification Search
CPC . H04L 43/06; H04L 63/1416; H04L 63/1433; H04L 63/1458; H04L 63/1466; H04L 63/20
See application file for complete search history.

(56) References Cited

U.S. PATENT DOCUMENTS 6,574,737 B1 6/2003 Kingsford et al.
6,711,127 B1 3/2004 Gorman et al.
(Continued)

FOREIGN PATENT DOCUMENTS

CN 103200230 A 7/2013
CN 103916384 A 7/2014
(Continued)

OTHER PUBLICATIONS

CN103200230 Machine Translation (by EPO and Google)—published Jul. 10, 2013; Li Qianmu.
(Continued)

*Primary Examiner* — Daniel B Potratz
*Assistant Examiner* — Matthias Habtegeorgis
(74) *Attorney, Agent, or Firm* — Momentum IP; Marc Van Dyke

(57) ABSTRACT

Methods and systems for penetration testing of a networked system involve assigning network nodes to disjoint classes based on current information about the compromisability of the network nodes. The classes distinguish between nodes not currently known to be compromisable, nodes that only recently have become known to be compromisable, e.g., by a first method of a attack, and nodes that have been known for a longer time to be compromisable. Nodes that only recently have become known to be compromisable can be re-targeted by the penetration testing system to determine whether such nodes can be compromised using multiple methods of attack and not just using the first method of attack.

21 Claims, 8 Drawing Sheets

(52) U.S. Cl.
CPC ...... *H04L 63/1458* (2013.01); *H04L 63/1466* (2013.01); *H04L 63/20* (2013.01)

(56) References Cited

U.S. PATENT DOCUMENTS

| | | | |
|---|---|---|---|
| 6,918,038 B1 | 7/2005 | Smith et al. |
| 6,952,779 B1 | 10/2005 | Cohen et al. |
| 7,013,395 B1 | 3/2006 | Swiler et al. |
| 7,296,092 B2 | 11/2007 | Nguyen |
| 7,693,810 B2 | 4/2010 | Donoho et al. |
| 7,757,293 B2 | 7/2010 | Caceres et al. |
| 7,926,113 B1 | 4/2011 | Gula et al. |
| 7,934,254 B2 | 4/2011 | Graham |
| 7,966,659 B1 | 6/2011 | Wilkinson et al. |
| 8,001,589 B2 | 8/2011 | Ormazabal et al. |
| 8,112,016 B2 | 2/2012 | Matsumoto et al. |
| 8,127,359 B2 | 2/2012 | Kelekar |
| 8,266,702 B2 | 9/2012 | Naldurg et al. |
| 8,321,944 B1 | 11/2012 | Mayer et al. |
| 8,356,353 B2 | 1/2013 | Futoransky et al. |
| 8,365,289 B2 | 1/2013 | Russ et al. |
| 8,392,997 B2 | 3/2013 | Chen et al. |
| 8,490,193 B2 | 7/2013 | Sarraute Yamada et al. |
| 8,490,196 B2 | 7/2013 | Lucangeli Obes et al. |
| 8,650,651 B2 | 2/2014 | Podjarny et al. |
| 8,752,183 B1 | 6/2014 | Heiderich et al. |
| 8,813,235 B2 | 8/2014 | Sidagni |
| 8,844,041 B1 | 9/2014 | Kienzle et al. |
| 9,015,301 B2 | 4/2015 | Redlich et al. |
| 9,015,847 B1 | 4/2015 | Kaplan et al. |
| 9,076,013 B1 | 7/2015 | Bailey, Jr. et al. |
| 9,100,430 B1 | 8/2015 | Seiver et al. |
| 9,183,397 B2 | 11/2015 | Futoransky et al. |
| 9,215,245 B1 | 12/2015 | Rajab et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,412,073 B2 | 8/2016 | Brandt et al. |
| 9,467,467 B2 | 10/2016 | Alamuri |
| 9,473,522 B1 | 10/2016 | Kotler et al. |
| 9,558,355 B2 | 1/2017 | Madou et al. |
| 9,742,788 B2 | 8/2017 | Hassanzadeh et al. |
| 9,760,716 B1 | 9/2017 | Mulchandani |
| 9,781,160 B1 | 10/2017 | Irimie et al. |
| 9,800,603 B1 | 10/2017 | Sidagni |
| 9,824,222 B1 | 11/2017 | Kaplan et al. |
| 9,870,715 B2 | 1/2018 | Sadeh-Koniecpol et al. |
| 9,894,090 B2 | 2/2018 | Hebert et al. |
| 9,912,687 B1 | 3/2018 | Wescoe et al. |
| 10,038,711 B1 | 7/2018 | Gorodissky et al. |
| 10,068,095 B1 | 9/2018 | Segal et al. |
| 10,108,803 B2 | 10/2018 | Chari et al. |
| 10,122,750 B2 | 11/2018 | Gorodissky et al. |
| 10,182,040 B2 | 1/2019 | Hu et al. |
| 10,257,220 B2 | 4/2019 | Gorodissky et al. |
| 10,291,643 B2 | 5/2019 | Marquez et al. |
| 10,367,846 B2 | 7/2019 | Gorodissky et al. |
| 10,382,473 B1 | 8/2019 | Ashkenazy et al. |
| 10,412,112 B2 | 9/2019 | Ashkenazy et al. |
| 10,440,044 B1 | 10/2019 | Zini et al. |
| 10,447,721 B2 | 10/2019 | Lasser |
| 10,454,966 B2 | 10/2019 | Gorodissky et al. |
| 10,462,177 B1 | 10/2019 | Lasser et al. |
| 10,469,521 B1 | 11/2019 | Segal et al. |
| 10,498,803 B1 | 12/2019 | Zini et al. |
| 10,503,911 B2 | 12/2019 | Chari et al. |
| 10,505,969 B2 | 12/2019 | Gorodissky et al. |
| 10,534,917 B2 | 1/2020 | Segal |
| 10,574,684 B2 | 2/2020 | Segal et al. |
| 10,574,687 B1 | 2/2020 | Lasser |
| 10,581,895 B2 | 3/2020 | Ashkenazy et al. |
| 10,637,882 B2 | 4/2020 | Gorodissky et al. |
| 10,637,883 B1 | 4/2020 | Segal et al. |
| 10,645,113 B2 | 5/2020 | Gorodissky et al. |
| 10,652,269 B1 | 5/2020 | Segal et al. |
| 10,686,822 B2 | 6/2020 | Segal |
| 10,686,823 B2 | 6/2020 | Gorodissky et al. |
| 10,880,326 B1 | 12/2020 | Gofman |
| 10,911,476 B2 | 2/2021 | Gorodissky et al. |
| 10,999,308 B2 | 5/2021 | Gorodissky et al. |
| 2003/0140223 A1 | 7/2003 | Desideri |
| 2003/0195861 A1 | 10/2003 | McClure et al. |
| 2003/0208616 A1 | 11/2003 | Laing et al. |
| 2003/0212779 A1 | 11/2003 | Boyter et al. |
| 2003/0217039 A1 | 11/2003 | Kurtz et al. |
| 2004/0015728 A1 | 1/2004 | Cole et al. |
| 2004/0078384 A1 | 4/2004 | Keir et al. |
| 2004/0095907 A1 | 5/2004 | Agee et al. |
| 2005/0086502 A1 | 4/2005 | Rayes et al. |
| 2005/0100157 A1 | 5/2005 | Gray et al. |
| 2005/0102534 A1 | 5/2005 | Wong |
| 2006/0015943 A1 | 1/2006 | Mahieu |
| 2006/0218640 A1 | 9/2006 | Lotem et al. |
| 2007/0011319 A1 | 1/2007 | McClure et al. |
| 2007/0204347 A1 | 8/2007 | Caceres et al. |
| 2007/0271360 A1 | 11/2007 | Sahita et al. |
| 2008/0092237 A1 | 4/2008 | Yoon et al. |
| 2008/0104702 A1 | 5/2008 | Choi et al. |
| 2008/0172716 A1 | 7/2008 | Talpade et al. |
| 2008/0209567 A1 | 8/2008 | Lockhart et al. |
| 2008/0256638 A1 | 10/2008 | Russ et al. |
| 2008/0288822 A1 | 11/2008 | Wu et al. |
| 2009/0007270 A1 | 1/2009 | Futoransky et al. |
| 2009/0044277 A1 | 2/2009 | Aaron |
| 2009/0049553 A1 | 2/2009 | Vasudeva |
| 2009/0172813 A1 | 7/2009 | Aaron |
| 2010/0138925 A1 | 6/2010 | Barai et al. |
| 2011/0016513 A1 | 1/2011 | Bailey, Jr. |
| 2011/0035803 A1 | 2/2011 | Lucangeli Obes et al. |
| 2011/0061104 A1 | 3/2011 | Sarraute Yamada et al. |
| 2011/0078507 A1 | 3/2011 | Choi et al. |
| 2012/0174228 A1 | 7/2012 | Giakouminakis et al. |
| 2012/0255022 A1 | 10/2012 | Ocepek et al. |
| 2013/0014263 A1 | 1/2013 | Porcello et al. |
| 2013/0031635 A1 | 1/2013 | Lotem et al. |
| 2013/0347116 A1 | 12/2013 | Flores et al. |
| 2014/0007241 A1 | 1/2014 | Gula et al. |
| 2014/0137257 A1 | 5/2014 | Martinez et al. |
| 2014/0165204 A1 | 6/2014 | Williams et al. |
| 2014/0173739 A1 | 6/2014 | Ahuja et al. |
| 2014/0237606 A1 | 8/2014 | Futoransky et al. |
| 2014/0328423 A1 | 11/2014 | Agee et al. |
| 2015/0031332 A1 | 1/2015 | Clark et al. |
| 2015/0058993 A1 | 2/2015 | Choi et al. |
| 2015/0237063 A1 | 8/2015 | Cotton et al. |
| 2016/0044057 A1 | 2/2016 | Chenette et al. |
| 2016/0134653 A1 | 5/2016 | Vallone et al. |
| 2016/0147635 A1 | 5/2016 | Schwarzmann |
| 2016/0234251 A1 | 8/2016 | Boice et al. |
| 2016/0234661 A1 | 8/2016 | Narasimhan et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1 | 12/2016 | Sivan et al. |
| 2017/0006055 A1 | 1/2017 | Strom et al. |
| 2017/0013008 A1 | 1/2017 | Carey et al. |
| 2017/0019421 A1 | 1/2017 | Hebert et al. |
| 2017/0046519 A1 | 2/2017 | Cam |
| 2017/0063886 A1 | 3/2017 | Muddu et al. |
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0123925 A1 | 5/2017 | Patnaik et al. |
| 2017/0149816 A1 | 5/2017 | Kelekar |
| 2017/0214701 A1 | 7/2017 | Hasan |
| 2017/0223043 A1 | 8/2017 | Munoz et al. |
| 2017/0279843 A1 | 9/2017 | Schultz et al. |
| 2017/0286690 A1 | 10/2017 | Chari et al. |
| 2017/0373923 A1 | 12/2017 | Kazachkov et al. |
| 2018/0018465 A1 | 1/2018 | Carey et al. |
| 2018/0034846 A1 | 2/2018 | Marquez et al. |
| 2018/0103052 A1 | 4/2018 | Choudhury et al. |

(56) References Cited

U.S. PATENT DOCUMENTS

| | | |
|---|---|---|
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |
| 2018/0330103 A1 | 11/2018 | Chari et al. |
| 2018/0365429 A1 | 12/2018 | Segal |
| 2018/0375892 A1 | 12/2018 | Ganor |
| 2019/0014141 A1 | 1/2019 | Segal et al. |
| 2019/0036961 A1 | 1/2019 | Gorodissky et al. |
| 2019/0068631 A1 | 2/2019 | Ashkenazy et al. |
| 2019/0081974 A1 | 3/2019 | Lasser |
| 2019/0149572 A1 | 5/2019 | Gorodissky et al. |
| 2019/0182270 A1 | 6/2019 | Kim |
| 2019/0182286 A1 | 6/2019 | Zini |
| 2019/0245883 A1 | 8/2019 | Gorodissky et al. |
| 2019/0268369 A1 | 8/2019 | Gorodissky et al. |
| 2019/0312903 A1 | 10/2019 | Zini et al. |
| 2019/0364070 A1 | 11/2019 | Zini et al. |
| 2019/0387015 A1 | 12/2019 | Ashkenazy et al. |
| 2020/0106792 A1* | 4/2020 | Louie ................. H04L 63/1483 |
| 2020/0106800 A1 | 4/2020 | Gorodissky et al. |
| 2020/0145449 A1 | 5/2020 | Segal et al. |
| 2020/0153852 A1 | 5/2020 | Segal et al. |
| 2020/0236130 A1 | 7/2020 | Gorodissky et al. |
| 2020/0280577 A1 | 9/2020 | Segal et al. |
| 2020/0358805 A1 | 11/2020 | Segal et al. |
| 2021/0144169 A1 | 5/2021 | Lasser |
| 2021/0226984 A1 | 7/2021 | Gorodissky et al. |
| 2021/0258334 A1 | 8/2021 | Sayag et al. |
| 2021/0273967 A1* | 9/2021 | Vela .................... H04L 63/1433 |
| 2021/0314341 A1 | 10/2021 | Moskovich |
| 2022/0201042 A1* | 6/2022 | Crabtree ............ G06F 16/2477 |

FOREIGN PATENT DOCUMENTS

| | | |
|---|---|---|
| CN | 104009881 A | 8/2014 |
| EP | 1559008 A | 8/2005 |
| EP | 3079336 A1 | 10/2016 |
| WO | 0038036 A | 6/2000 |
| WO | 2008054982 A | 5/2008 |
| WO | 2010069587 A | 6/2010 |
| WO | 2013087982 A | 6/2013 |
| WO | 2015111039 A | 7/2015 |
| WO | 2016164844 A | 10/2016 |
| WO | 2018156394 A | 8/2018 |

OTHER PUBLICATIONS

CN103916384 Machine Translation (by EPO and Google)—published Jul. 9, 2014 Zhong Li.
CN104009881 Machine Translation (by EPO and Google)—published Aug. 27, 2014 Wang Tian.
Authors: Alhomidi and Reed Title: Attack Graph-Based Risk Assessment and Optimisation Approach International Journal of Network Sercurity & Its Applications (IJNSA), vol. 6, No. 3, May 2014.

* cited by examiner

```
┌─────────────────────────────────────────────────────────────────────────────┐
│ Select S01 a network node from the nodes of the networked system to be a next target │
│ network node, wherein the network node is a member of the first class       │
└─────────────────────────────────────────────────────────────────────────────┘
                                      ↓
┌─────────────────────────────────────────────────────────────────────────────┐
│ Determine S02 that the network node is compromisable by the attacker by using a first │
│ attack method                                                               │
└─────────────────────────────────────────────────────────────────────────────┘
                                      ↓
┌─────────────────────────────────────────────────────────────────────────────┐
│ S03: In response to the determining that the network node is compromisable by using │
│ the first attack method: change the assignment of the network node from the first class │
│ to the second class; and assign a respective time value to the network node │
└─────────────────────────────────────────────────────────────────────────────┘
                                      ↓
┌─────────────────────────────────────────────────────────────────────────────┐
│ S04: Subsequent to the determining that the network node is compromisable by using │
│ the first attack method and while the elapsed time between the time of determining │
│ that the network node is compromisable by using the first attack method and the │
│ current time is less than or equal to the respective time value assigned to the network │
│ node, select the network node to be a next target network node a second time, and │
│ determine that the network node is compromisable by the attacker by using a second │
│ attack method, different from the first attack method                       │
└─────────────────────────────────────────────────────────────────────────────┘
                                      ↓
┌─────────────────────────────────────────────────────────────────────────────┐
│ Change S05 the assignment of the network node from the second class to the third class, │
│ in response to determining that the elapsed time between the time of determining that │
│ the network node is compromisable by using the first attack method and the current │
│ time exceeds the respective time value assigned to the network node, thereby disabling │
│ additional selection of the network node to be a next target network node  │
└─────────────────────────────────────────────────────────────────────────────┘
                                      ↓
┌─────────────────────────────────────────────────────────────────────────────┐
│ Determine S06 a first way for the attacker to compromise the networked system, │
│ wherein the first way for the attacker to compromise the networked system includes a │
│ step of compromising the network node using the first attack method        │
└─────────────────────────────────────────────────────────────────────────────┘
                                      ↓
┌─────────────────────────────────────────────────────────────────────────────┐
│ Determine S07 a second way for the attacker to compromise the networked system, │
│ wherein the second way for the attacker to compromise the networked system includes │
│ a step of compromising the network node using the second attack method     │
└─────────────────────────────────────────────────────────────────────────────┘
                                      ↓
┌─────────────────────────────────────────────────────────────────────────────┐
│ Report S08 the first and second determined ways for the attacker to compromise the │
│ networked system, the reporting comprising at least one action selected from the │
│ actions group consisting of (i) causing a display device to display a report including │
│ information about the determined first and second ways to compromise the networked │
│ system, (ii) recording the report including the information about the determined first │
│ and second ways to compromise the networked system in a file, and (iii) electronically │
│ transmitting the report including the information about the determined first and │
│ second ways to compromise the networked system                             │
└─────────────────────────────────────────────────────────────────────────────┘
```

FIG. 7

DETERMINING MULTIPLE WAYS FOR COMPROMISING A NETWORK NODE IN A PENETRATION TESTING CAMPAIGN

CROSS-REFERENCE TO RELATED APPLICATIONS

This patent application claims the benefit of U.S. Provisional Patent Application No. 63/005,515 filed on Apr. 6, 2020, which is incorporated herein by reference in its entirety.

FIELD OF THE INVENTION

The present invention relates to systems and methods for penetration testing of networked systems which identify attack methods that an attacker can use to compromise a network node. In particular, the present invention is suitable for penetration testing of networked systems to determine multiple attack methods that an attacker can use to compromise a given networked node.

BACKGROUND

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause a significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers are reporting incidents in which websites crashed, sensitive data was stolen or service to customers was denied, where the failures were the results of hostile penetration into an organization's networked computing system.

As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

SUMMARY OF THE INVENTION

A method is disclosed, according to embodiments of the present invention, of carrying out penetration testing of a networked system by a penetration testing system to determine one or more ways for an attacker to compromise the networked system. According to the method, the penetration testing system assigns network nodes of the networked system to disjoint classes based on current information about the compromisability of the network nodes, the classes consisting of (i) a first class, wherein each network node that is a member of the first class at the current time is not currently known to be compromisable by the attacker, (ii) a second class, wherein each given network node that is a member of the second class at the current time is currently known to be compromisable by the attacker, and wherein the elapsed time between the time of determining that the given network node is compromisable and the current time is less than or equal to a respective time value, and (iii) a third class, wherein each given network node that is a member of the third class at the current time is currently known to be compromisable by the attacker, and wherein the elapsed time between the time of determining that the given network node is compromisable and the current time is more than a respective time value. The method comprises: (a) selecting a network node from the nodes of the networked system to be a next target network node, wherein the network node is a member of the first class; (b) determining that the network node is compromisable by the attacker by using a first attack method; (c) in response to the determining that the network node is compromisable by using the first attack method: changing the assignment of the network node from the first class to the second class, and assigning a respective time value to the network node; (d) subsequent to the determining that the network node is compromisable by using the first attack method and while the elapsed time between the time of determining that the network node is compromisable by using the first attack method and the current time is less than or equal to the respective time value assigned to the network node, performing the following: selecting the network node to be a next target network node a second time, and determining that the network node is compromisable by the attacker by using a second attack method, different from the first attack method; (e) in response to determining that the elapsed time between the time of determining that the network node is compromisable by using the first attack method and the current time exceeds the respective time value assigned to the network node, changing the assignment of the network node from the second class to the third class, thereby disabling additional selection of the network node to be a next target network node; (f) determining a first way for the attacker to compromise the networked system, wherein the first way for the attacker to compromise the networked system includes a step of compromising the network node using the first attack method; (g) determining a second way for the attacker to compromise the networked system, wherein the second way for the attacker to compromise the networked system includes a step of compromising the network node using the second attack method; and (h) reporting the first and second determined ways for the attacker to compromise the networked system, the reporting comprising at least one action selected from the actions group consisting of (i) causing a display device to display a report including information about the determined first and second ways to compromise the networked system, (ii) recording the report including the information about the determined first and second ways to compromise the networked system in a file, and (iii) electronically transmitting the report including the information about the determined first and second ways to compromise the networked system.

It should be noted that even though it is stated above that for each given network node that is a member of the second class, the elapsed time between the time of determining that the given network node is compromisable and the current time is less than or equal to a respective time value, it is permissible that the second class will temporarily and briefly include network nodes that do not strictly comply with this rule. This is due to the non-zero time it might take the penetration testing system to determine that a given network node no longer meets the condition required for being a member of the second class and should be moved to the third class. This might happen, for example, when the penetration testing system updates the classes membership status periodically (e.g. every two seconds). If it so happens that for the given network node, that is currently a member of the second class, the elapsed time between the time of determining that the given network node is compromisable and the current time reaches its respective time value immediately after a classes membership update was made, then until the next classes membership update is scheduled (i.e. in this example for slightly less than two seconds), the given network node remains in the second class even though it should now be in the third class. Such temporary and brief deviations from the strict rules of classes membership are permissible, as they do not affect the operation and usefulness of the present invention.

It should also be noted that even though it is stated above that a given network node that is currently known to be compromisable by the attacker and for which the elapsed time between the time of determining that the given network node is compromisable and the current time is equal to its respective time value is a member of the second class, this is not necessarily so. It is equally permissible to define the classes such that (i) for each given network node which is a member of the second class, the elapsed time between the time of determining that the given network node is compromisable and the current time is less than its respective time value, and (ii) for each given network node which is a member of the third class, the elapsed time between the time of determining that the given network node is compromisable and the current time is more than or equal to its respective time value. This variation in the classification rules is considered to be fully equivalent to the previously specified classification rules, as they do not affect the operation and usefulness of the present invention.

In some embodiments, the penetration testing system can be a simulated penetration testing system. In some embodiments, the penetration testing system can be an actual attack penetration testing system.

In some embodiments, the respective time value assigned to the network node can be predetermined before starting the penetration testing. In some embodiments, the respective time value assigned to the network node can be based on an identity of the network node. In some embodiments, the respective time value assigned to the network node can be based on an importance level of the network node. In some embodiments, the respective time value assigned to the network node can be based on the time elapsed between the beginning of the penetration testing and the determining that the network node is compromisable by using the first attack method. In some embodiments, the respective time value assigned to the network node can be based on a cost of exploitation of the first attack method.

In some embodiments, the method can further comprise: (i) in response to the determining that the network node is compromisable by using the second attack method, changing the respective time value of the network node. In some such embodiments, the changing of the respective time value of the network node can consist of increasing the respective time value by an amount equal to the time elapsed between the determining that the network node is compromisable by using the first attack method and the determining that the network node is compromisable by using the second attack method.

In some embodiments, the method can further comprise: (i) in response to the determining that the network node is compromisable by using the first attack method, storing information about the first attack method; and (j) in response to the determining that the network node is compromisable by using the second attack method, comparing information about the second attack method with the stored information about the first attack method in order to determine that the second attack method is different from the first attack method.

In some embodiments, in response to the determining that the network node is compromisable by using the first attack method, the penetration testing system can start to consider the network node to be under control of the attacker for the purpose of using the network node for compromising other network nodes.

In some embodiments, in response to the changing of the assignment of the network node from the second class to the third class, the penetration testing system can start to consider the network node to be under control of the attacker for the purpose of using the network node for compromising other network nodes.

In some embodiments, in response to the determining that the network node is compromisable by using the first attack method and until the determining that the time elapsed between the time of determining that the network node is compromisable using the first attack method and the current time exceeds the respective time value assigned to the network node, the penetration testing system can assign a high priority to finding an additional attack method using which the network node is compromisable by the attacker.

In some embodiments, after the determining that the network node is compromisable by using the first attack method and until the determining that the time elapsed between the time of determining that the network node is compromisable by using the first attack method and the current time exceeds the respective time value assigned to the network node, the network node can be shown on a second display device as a network node that is not known to be compromisable by the attacker at the current time.

In some embodiments, in response to the determining that the network node is compromisable by using the first attack method, the network node can be shown on a second display device as a network node that is known to be compromisable by the attacker at the current time.

In some embodiments, in response to the determining that the network node is compromisable by using the first attack method and until the determining that the time elapsed between the time of determining that the network node is compromisable by using the first attack method and the current time exceeds the respective time value assigned to the network node, the network node can be shown on a second display device as a network node that is in a state that is different from both (i) the state of network nodes that are not known to be compromisable by the attacker at the current time, and (ii) the state of network nodes that are known to be compromisable by the attacker at the current time.

In some embodiments, it can be that (i) the first and second determined ways for the attacker to compromise the networked system differ only in that the first determined way uses the first attack method for compromising the network node and the second determined way uses the second attack method for compromising the network node, and (ii) the reporting of the first and second determined ways for the attacker to compromise the networked system includes causing the display device to display the first and second determined ways as two separate ways to compromise the networked system.

In some embodiments, it can be that (i) the first and second determined ways for the attacker to compromise the networked system differ only in that the first determined way uses the first attack method for compromising the network node and the second determined way uses the second attack method for compromising the network node, and (ii) the reporting of the first and second determined ways for the attacker to compromise the networked system includes causing the display device to display the first and second determined ways as a single way for the attacker to compromise the networked system, where the displayed single way to compromise the networked system uses a single attack method that is one of the first and second attack methods for compromising the network node, the displaying of the single attack method indicating there is at least one other attack method that may be used for compromising the network node.

In some embodiments, the method can further comprise: (i) providing remediation recommendations for the networked system, the remediation recommendations including recommendations for: (i) blocking the first attack method from compromising the network node, and (ii) blocking the second attack method from compromising the network node.

A penetration testing system is disclosed, according to embodiments of the present invention, for carrying out penetration testing of a networked system to determine one or more ways for an attacker to compromise the networked system. The penetration testing system is configured to assign network nodes of the networked system to disjoint classes based on current information about the compromisability of the network nodes, the classes consisting of (i) a first class, wherein each network node that is a member of the first class at the current time is not currently known to be compromisable by the attacker, (ii) a second class, wherein each given network node that is a member of the second class at the current time is currently known to be compromisable by the attacker, and wherein the elapsed time between the time of determining that the given network node is compromisable and the current time is less than or equal to a respective time value, and (iii) a third class, wherein each given network node that is a member of the third class at the current time is currently known to be compromisable by the attacker, and wherein the elapsed time between the time of determining that the given network node is compromisable and the current time is more than a respective time value. The penetration testing system comprises: (a) a computing device comprising one or more processors, the computing device in networked communication with multiple network nodes of the networked system; and (b) a non-transitory computer-readable storage medium containing program instructions, wherein execution of the program instructions by the one or more processors of the computing device causes the one or more processors of the computing device to carry out the following steps: (i) selecting a network node from the nodes of the networked system to be a next target network node, wherein the network node is a member of the first class; (ii) determining that the network node is compromisable by the attacker by using a first attack method; (iii) in response to the determining that the network node is compromisable by using the first attack method, changing the assignment of the network node from the first class to the second class and assigning a respective time value to the network node; (iv) subsequent to the determining that the network node is compromisable by using the first attack method and while the elapsed time between the time of determining that the network node is compromisable by using the first attack method and the current time is less than or equal to the respective time value assigned to the network node, selecting the network node to be a next target network node a second time and determining that the network node is compromisable by the attacker by using a second attack method, different from the first attack method; (v) in response to determining that the elapsed time between the time of determining that the network node is compromisable by using the first attack method and the current time exceeds the respective time value assigned to the network node, changing the assignment of the network node from the second class to the third class, thereby disabling additional selection of the network node to be a next target network node; (vi) determining a first way for the attacker to compromise the networked system, wherein the first way for the attacker to compromise the networked system includes a step of compromising the network node using the first attack method; (vii) determining a second way for the attacker to compromise the networked system, wherein the second way for the attacker to compromise the networked system includes a step of compromising the network node using the second attack method; and (viii) reporting the first and second determined ways for the attacker to compromise the networked system, the reporting comprising at least one action selected from the actions group consisting of (i) causing a display device to display a report including information about the determined first and second ways to compromise the networked system, (ii) recording the report including the information about the determined first and second ways to compromise the networked system in a file, and (iii) electronically transmitting the report including the information about the determined first and second ways to compromise the networked system.

In some embodiments, the penetration testing system can be a simulated penetration testing system. In some embodiments, the penetration testing system can be an actual attack penetration testing system.

In some embodiments, the respective time value assigned to the network node can be predetermined before starting the penetration testing. In some embodiments, the respective time value assigned to the network node is based on an identity of the network node. In some embodiments, the respective time value assigned to the network node can be based on an importance level of the network node. In some embodiments, the respective time value assigned to the network node can be based on the time elapsed between the beginning of the penetration testing and the determining that the network node is compromisable by using the first attack method. In some embodiments, the respective time value assigned to the network node can be based on a cost of exploitation of the first attack method.

In some embodiments, the execution of the program instructions by the one or more processors of the computing device can cause the one or more processors of the computing device to additionally carry out the following step: (ix) in response to the determining that the network node is compromisable by using the second attack method, changing the respective time value of the network node.

In some such embodiments, the changing of the respective time value of the network node can consist of increasing the respective time value by an amount equal to the time elapsed between the determining that the network node is compromisable by using the first attack method and the determining that the network node is compromisable by using the second attack method.

In some embodiments, the execution of the program instructions by the one or more processors of the computing device can cause the one or more processors of the computing device to additionally carry out the following steps: (ix) in response to the determining that the network node is compromisable by using the first attack method, storing information about the first attack method; and (x) in response to the determining that the network node is compromisable by using the second attack method, comparing information about the second attack method with the stored information about the first attack method in order to determine that the second attack method is different from the first attack method.

In some embodiments, the execution of the program instructions by the one or more processors of the computing device can cause the one or more processors of the computing device, in response to the determining that the network node is compromisable by using the first attack method, to start considering the network node to be under control of the attacker for the purpose of using the network node for compromising other network nodes.

In some embodiments, the execution of the program instructions by the one or more processors of the computing device can cause the one or more processors of the computing device, in response to the changing of the assignment of the network node from the second class to the third class, to start considering the network node to be under control of the attacker for the purpose of using the network node for compromising other network nodes.

In some embodiments, the execution of the program instructions by the one or more processors of the computing device can cause the one or more processors of the computing device, in response to the determining that the network node is compromisable by using the first attack method and until the determining that the time elapsed between the time of determining that the network node is compromisable using the first attack method and the current time exceeds the respective time value assigned to the network node, to assign a high priority to finding an additional attack method using which the network node is compromisable by the attacker.

In some embodiments, after the determining that the network node is compromisable by using the first attack method and until the determining that the time elapsed between the time of determining that the network node is compromisable by using the first attack method and the current time exceeds the respective time value assigned to the network node, the network node can be shown on a second display device as a network node that is not known to be compromisable by the attacker at the current time.

In some embodiments, in response to the determining that the network node is compromisable by using the first attack method, the network node can be shown on a second display device as a network node that is known to be compromisable by the attacker at the current time.

In some embodiments, in response to the determining that the network node is compromisable by using the first attack method and until the determining that the time elapsed between the time of determining that the network node is compromisable by using the first attack method and the current time exceeds the respective time value assigned to the network node, the network node can be shown on a second display device as a network node that is in a state that is different from both (i) the state of network nodes that are not known to be compromisable by the attacker at the current time, and (ii) the state of network nodes that are known to be compromisable by the attacker at the current time.

In some embodiments, it can be that (i) the first and second determined ways for the attacker to compromise the networked system differ only in that the first determined way uses the first attack method for compromising the network node and the second determined way uses the second attack method for compromising the network node, and (ii) the reporting of the first and second determined ways for the attacker to compromise the networked system includes causing the display device to display the first and second determined ways as two separate ways to compromise the networked system.

In some embodiments, it can be that (i) the first and second determined ways for the attacker to compromise the networked system differ only in that the first determined way uses the first attack method for compromising the network node and the second determined way uses the second attack method for compromising the network node, and (ii) the reporting of the first and second determined ways for the attacker to compromise the networked system includes causing the display device to display the first and second determined ways as a single way for the attacker to compromise the networked system, where the displayed single way to compromise the networked system uses a single attack method that is one of the first and second attack methods for compromising the network node, the displaying of the single attack method indicating there is at least one other attack method that may be used for compromising the network node.

In some embodiments, the execution of the program instructions by the one or more processors of the computing device can cause the one or more processors of the computing device to additionally carry out the following step: (ix) providing remediation recommendations for the networked system, the remediation recommendations including recommendations for: (i) blocking the first attack method from compromising the network node, and (ii) blocking the second attack method from compromising the network node.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

FIGS. 7-10 show flowcharts of methods of carrying out a penetration testing campaign of a networked system by a penetration testing system, according to embodiments of the present invention

DETAILED DESCRIPTION OF THE EMBODIMENTS

Figure 1:
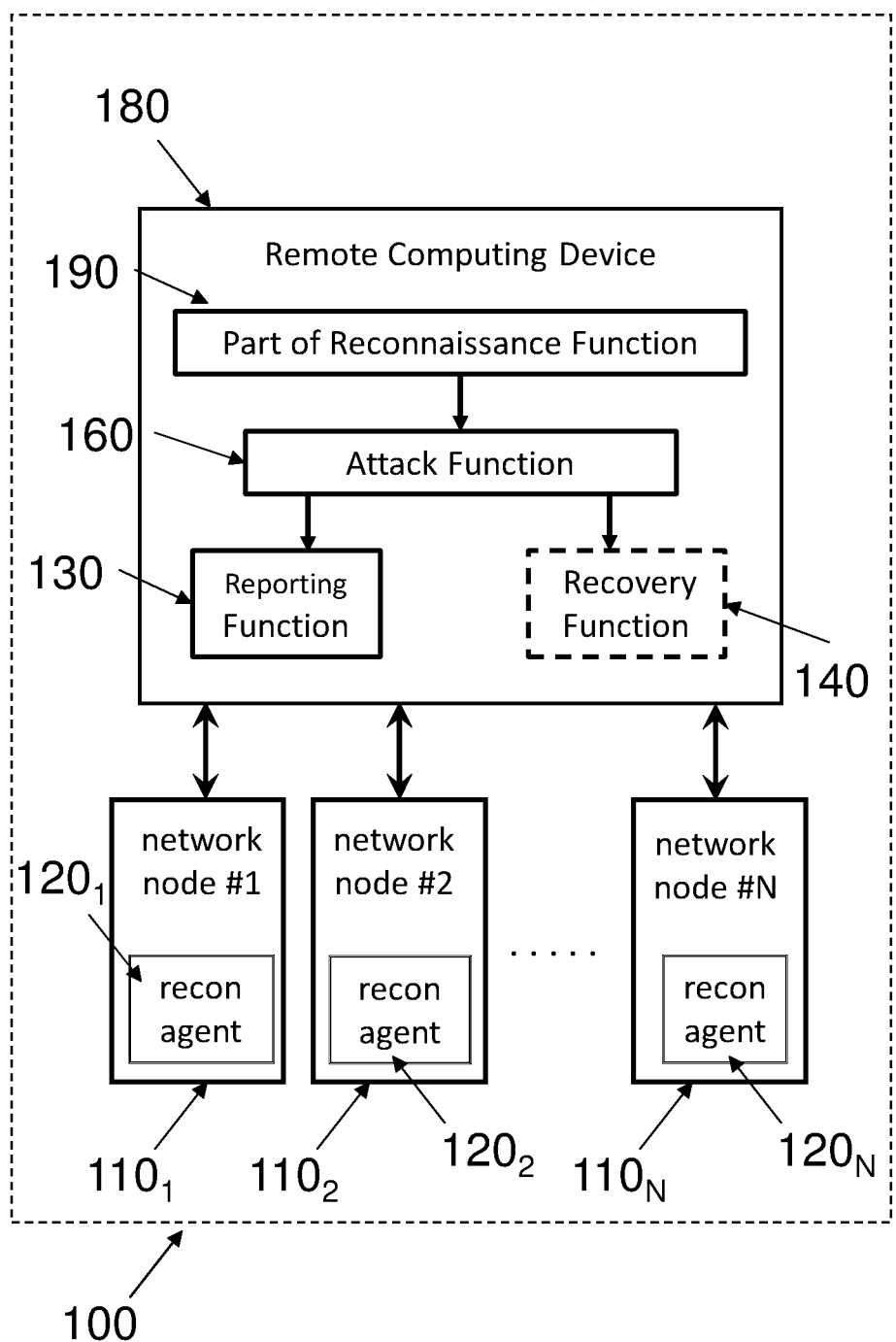
FIG. 1 is a functional block diagram of a reconnaissance agent penetration testing system which may employ embodiments of the present invention.

Note: Throughout this disclosure, subscripted reference numbers (e.g., $10_1$ or $10_A$) may be used to designate multiple separate appearances of elements of a single species, whether in a drawing or not; for example: $10_1$ is a single appearance (out of a plurality of appearances) of element 10. The same elements can alternatively be referred to without subscript (e.g., 10 and not $10_1$) when not referring to a specific one of the multiple separate appearances, i.e., to the species in general. In some cases, subscripted reference numbers are used to designate an element of the same species having a different design but the same functionality as other elements of the same species.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function, as defined as definition "14" in the Definitions Section hereinbelow, is the function within a penetration testing system that handles the collection of data about the tested networked system. The collected data may include internal data of networks nodes, data about network traffic within the tested networked system, business intelligence data of the organization owning the tested networked system, etc. The functionality of a reconnaissance function can be implemented, for example, by software executing in a server that is not one of the network nodes of the tested networked system, where the server probes the tested networked system for the purpose of collecting data about it.

An attack function, as defined as definition "15" in the Definitions Section, is the function within a penetration testing system that handles the determination of whether security vulnerabilities exist in the tested networked system based on data collected by the reconnaissance function. The functionality of an attack function can be implemented, for example, by software executing in a server that is not one of the nodes of the tested networked system, where the server attempts to attack the tested networked system for the purpose of verifying that it can be compromised.

A reporting function, as defined as definition "16" in the Definitions Section, is the function within a penetration testing system that handles the reporting of results of the penetration testing system. The functionality of a reporting function may be implemented, for example, by software executing in the same server that implements the functionality of the attack function, where the server reports the findings of the attack function to an administrator or a CISO of the tested networked system.

Referring now to the figures, and in particular to FIG. 1, a functional block diagram of a penetration testing system 100 is shown according to some embodiments, comprising a reconnaissance function. The scope of the disclosed embodiments encompasses provision and use of penetration testing systems of any suitable architecture and is not limited to penetration testing systems comprising reconnaissance agents. Even though the example provided in the figure and accompanying text is a reconnaissance agent penetration testing system, this is merely a non-limiting and illustrative example, and any type or architecture of a penetration testing system can benefit from the present invention.

The reconnaissance function includes functionality in reconnaissance agents 120 ($120_1$, $120_2$, . . . $120_N$) installed in respective network nodes 110 ($110_1$, $110_2$, . . . $110_N$) and, in some embodiments, also includes functionality in a remote computing device 180 in which is installed "part of reconnaissance function" 190. In some embodiments, an attack function 160, a reporting function 130, and optionally a recovery function 140 (also known in the industry as a 'clean-up' function and synonymous therewith, as defined as definition "17" in the Definitions Section), are all installed in the remote computing device 180. As explained in definition "15", an 'attack function' forms part of the architecture of every penetration testing system and performs the function of determining whether one or more security vulnerabilities exist in the tested networked system. In an alternative embodiment (NOT SHOWN), one or more network nodes of the tested networked system act as the remote computing device, so that any or all of the above-listed functions are installed in network nodes 110 instead of in a physically-remote remote computing device 180, or, alternatively, the functionality of the remote computing device 180 of FIG. 1 is split between the physically-remote remote computing device 180 and the network nodes 110.

All penetration testing systems can be characterized as doing either "actual attack penetration testing" or as doing "simulated penetration testing".

An actual attack penetration testing system does its penetration testing by attempting to attack the tested networked system. Such a system accesses the tested networked system during the test and is not limiting itself to simulation or evaluation. This includes verifying that the tested networked system can be compromised by actively attempting to compromise it and then checking if it was indeed compromised. This implies that a possible side-effect of executing an actual attack penetration test might be the compromising of the tested networked system.

A simulated penetration testing system does its penetration testing while avoiding disturbance to the tested networked system and specifically while avoiding any risk of compromising it. This implies that whenever there is a need to verify that the tested networked system can be compromised by an operation or a sequence of operations, the verification is done by simulating the results of that operation or sequence of operations or by otherwise evaluating them, without taking the risk of compromising the tested networked system.

In the present disclosure, the terms "a compromised node" and "a node known to be compromisable" are synonyms and are used interchangeably. When referring to an actual-attack penetration testing system, both terms mean a node that is already compromised in the current campaign. When referring to a simulated penetration testing system, both terms mean a node that was already determined to be compromisable in the current campaign.

Many penetration testing systems operate by iteratively (physically or simulatively) compromising network nodes of the tested networked system. At any iteration during the testing process (possibly except the first iteration, see below) some of the network nodes of the tested networked system are considered to be already compromised by the potential attacker, and the penetration testing system is attempting to compromise an additional network node (not yet compromised) by utilizing the already-compromised network nodes that are operating under the control of the attacker. Once an additional network node is compromised, it is added to the group of already-compromised network nodes and a new iteration of the testing begins. In the first iteration, the group of network nodes that are considered to be already compromised may be empty or may include one or more nodes that were defined to be already compromised when the testing process starts.

Each such iteration of compromising a new network node includes verifying the success of compromising the new network node under current conditions in the tested networked system. As explained above, in actual attack penetration testing systems the verifying is achieved by actively attempting to compromise the new network node, while in simulated penetration testing systems the verifying is achieved by simulating or evaluating the compromising step.

The Problem to Solve

In a typical iteration of an iterative penetration testing campaign (possibly except the first), some of the network nodes of the tested networked system are considered to be already compromised by the potential attacker. Network nodes that are considered to be already compromised are sometimes called "red nodes", while network node that are not known to be already compromised are sometimes called "blue nodes". Using this terminology, we can say that in each iteration of an iterative penetration testing campaign the penetration testing system attempts to convert one blue node into a red node.

As a result of the above, in prior art iterative penetration testing systems a node that had already been declared to be a red node will not be "attacked" again. Once a node becomes red and assumed to be under the attacker's control, the campaign will not try to compromise it a second time, as this provides no additional benefit for supporting the compromising of other nodes that are still blue nodes.

However, in many real-world cases, this can be a disadvantage of iterative penetration testing systems when a given node can be compromised using several different attack methods. The penetration testing campaign might find a first one of those several attack methods and then not look for and not become aware of the existence of the other attack methods. Consequently, when presenting the user with remediation recommendations based on the campaign results, the penetration testing system may recommend to defend the given node against the only attack method the system is aware of, but will completely ignore the other attack methods that can compromise the given node as it is not aware of their existence. The user might then implement the recommended measure for protecting the given node and assume that he now has adequate protection against attackers attempting to compromise the given node. But this will be a false belief if attackers can still exploit the other attack methods for compromising the given node.

One way of addressing this deficiency is to execute a campaign multiple times, where each execution is restricted to test for only a certain category of vulnerabilities. For example, vulnerabilities may be assigned to "complexity categories" according to the complexity of their exploitation by an attacker, and then the campaign may be executed a first time while using only "low complexity" vulnerabilities, a second time while using only "medium complexity" vulnerabilities and a third time using only "high complexity" vulnerabilities. The results of the three executions are then combined for the purpose of providing the remediation recommendations.

While this approach may indeed detect multiple attack methods for compromising a given node and therefore may recommend defending the given node against all detected attacks, it suffers from the following disadvantages:

A. It requires manual intervention by the user in order to select how many times the campaign should be executed and in order to select the constraints imposed on each of the campaign executions.

B. It causes the testing process to become much longer, as executing the campaign multiple times repeats execution of portions of the campaign whose repetition contributes nothing to the campaign results.

C. As not all nodes are vulnerable to vulnerabilities from all categories, some of the multiple campaign executions might fail to compromise some nodes because those nodes are not vulnerable to any vulnerability of the category currently being tested for. This in turn may cause some other nodes to not be reached during the current campaign run, thus resulting in incorrect conclusions.

For example, let us assume the only way to achieve full control of a tested networked system includes the following steps:

1. Compromise node A
2. Using compromised node A, compromise node B
3. Using compromised node B, compromise node C Also, let us further assume that:

a. Node A can be compromised only by using a vulnerability having high complexity
b. Node B can be compromised only by using a vulnerability having medium complexity
c. Node C can be compromised only by using a vulnerability having low complexity Execution of the penetration testing campaign limited only to low complexity vulnerabilities will not succeed in compromising node A, and consequently will not be able to compromise nodes B and C, whose compromisability depends on first compromising node A. Execution of the penetration testing campaign limited only to medium complexity vulnerabilities will also not succeed in compromising node A, and consequently will again not be able to compromise nodes B and C. Finally, execution of the penetration testing campaign limited only to high complexity vulnerabilities will succeed in compromising node A but will again fail in compromising nodes B and C, which can only be compromised using vulnerabilities having low or medium complexity. The end result of the multiple executions is that no execution of the campaign would succeed in compromising nodes B and C, and therefore the user will not be made aware of the danger of the attacker achieving full control of the networked system.

Another way of addressing the deficiency of missing the detection of multiple attack methods against a given node is to give up the iterative nature of the campaign and instead conduct an exhaustive search for all possible attack methods from every node to every other node. For example, in a first phase of the campaign every node is checked for any possible attacks coming from any other node in the tested networked system. Then, based on the results of the first phase, constructing a "vulnerability graph" that represents all available attacks, and finally determining optimal remediation recommendations based on the graph. However, such exhaustive approaches are very costly in terms of campaign execution time, especially for networked systems containing a large number of nodes.

Consequently, it is desirable to use a solution that will provide the efficiency of an iterative approach while avoiding or minimizing occurrences of missing additional attack methods of a node beyond the first one being detected during the campaign.

According to embodiments of the present invention, the conversion of a blue node to a red node is delayed. Instead of making the conversion immediately after finding an attack method which may be used by the attacker to compromise a given node, the conversion of the given node from blue to red is done after a delay period. The delay period would start as soon as it becomes known to the penetration testing system that the node is compromisable. For example, the delay period may be 1 minute, 5 minutes, 10 minutes, half an hour or an hour or even longer, and the newly determined already-known-to-be-compromisable node will be assigned to the "red" class of nodes only after the delay period ends.

As a result of postponing the conversion of a given node to a red node, the campaign continues to consider the given node to be a blue node until the end of the delay period. Consequently, the campaign continues looking for ways to compromise the given node, regardless of the fact that the given node was already shown to be compromisable. Therefore, one or more additional attack methods usable by an attacker to compromise the given node may be determined by the campaign.

In some embodiments, the delay period has a predetermined length that is applicable for all nodes. In other embodiments, the length of the delay period is not always the same for all nodes. For example, the length of the delay period may depend on the node—important or critical nodes of the networked system may be given longer delay periods than less important or less critical nodes, in order increase the chances of identifying all possible attack methods of the important nodes. In another example, the length of the delay period may depend on the stage in the penetration testing campaign in which the node is found to be compromisable; for example, nodes that are found to be compromisable early in a penetration testing campaign may be given longer delay periods than nodes that are found to be compromisable later in the campaign. The reason for this can be, inter alia, that closer to the end of the campaign it may be more important to compromise nodes that were not yet compromised at all than to find additional methods of compromising nodes that are already known to be compromisable. In still another example, the length of the delay period may depend on the exploitation cost of the attack method that was found to be usable by the attacker for compromising the node. In the case of an attack method having a high exploitation cost, a longer delay period may be suitable so as to increase the probability of finding additional attack methods that are cheaper for the attacker to use.

In some embodiments (whether using fixed-length delay periods or variable-length delay periods), the delay period for a given node to become red always ends after an initially-determined delay time that is measured from the time of determining the first attack method for the given node, regardless of the number of additional attack methods discovered during the delay period. In other words, even if additional attack methods are found during the delay period that was triggered by the determining of the first attack method, the delay period is not extended in such embodiments and always ends after the initially-determined delay time since the determining of the first method of attack for the given node.

In other embodiments (whether using fixed-length delay periods or variable-length delay periods), the delay period may be extended when one or more additional attack methods are found during the delay period. The reasoning behind such policy is that if the campaign keeps finding additional attack methods, then it is reasonable to assume there are still more attack methods to be found. As an example for such embodiments, the length of the delay period may be measured relative to the time of the determining of the most recent attack method. In other words, every determination of a new attack method resets the clock for starting to measure the delay period.

As it is possible that the campaign will again find the same attack method that was already found, care should be taken to handle such duplicates. When determining an attack method for a given node, information about the determination (e.g. node ID of the given node, vulnerability used by the attack method, node ID of the node from which the attack is launched, etc.) can be stored in a "pending red nodes" list (unless the attack is found to be a duplicate, as explained below). The information for a determination is removed from the list when the relevant node becomes red (i.e. when its delay period ends). Whenever the campaign determines an attack method for compromising a node, it can check it against the current pending red nodes list to make sure it is not a duplicate. The new determination may be considered to be a duplicate if there is an entry in the list with the same attacked node ID, same vulnerability and same launching node ID. If the newly determined attack method is found to be a duplicate, then it is discarded. Otherwise, it is a valid new determination and is handled as such.

In some embodiments, the lateral movement strategy of the campaign is not affected by the determination of an attack method of a given node and by the given node becoming "pending red". Except for the "check for duplicates" discussed above, the campaign is completely unaware of the pending change in the state of the given node. This implies, among other things, that the given node cannot be used as a base for launching attacks against other nodes until it becomes "officially red".

In other embodiments, the lateral movement strategy of the campaign may be affected by the determination of an attack method of a given node, even though the given node is still "pending red". For example, the campaign may use the given node as a base for launching attacks against other nodes while it is still "pending red". This is allowed because, for the purpose of forming attacks against other nodes, it is unimportant whether there are additional ways of compromising the given nodes or not. It is enough to know the given node is compromisable by at least a single attack method in order to use it for attacking other nodes.

In some embodiments, the lateral movement strategy of the campaign may be affected in other ways by the determination of an attack method of a given node, while the given node is still "pending red". For example, the strategy may be made to be biased towards looking for new attack methods for the given node. This can be desirable because there is now only a limited time window in which additional attack methods for the given node can be found. Once the delay period ends, the given node will never be checked again for additional attack methods during the current campaign, as it will now be "officially red". Embodiments that apply a bias towards repeatedly attempting to compromise a node that was just recently found to be compromisable fit very well in penetration testing systems which separate between selecting the next target network node to attempt to compromise and between selecting the vulnerability to try in the attempt, making the second choice dependent on the first. An example of such a penetration system in disclosed in U.S. Pat. No. 10,257,220 which is fully incorporated herein by reference.

This biasing of the lateral movement strategy or other adjustments of the strategy that are related to a recently compromised node can be used regardless of whether the recently compromised node may be used as a basis for attacking other nodes while it is still "pending red".

In many penetration testing systems, while a campaign is executing, the user is presented with a schematic map of the tested networked system, on which the progress of the campaign is shown. For example, nodes of the networked system are colored in blue or red for indicating their current state in the campaign and the user can follow the progress of the campaign as blue nodes turn into red.

In some embodiments, a "pending red" node is displayed as a blue node, as analysis of the node for determining vulnerabilities is still not complete. In other embodiments, a "pending red" node is displayed as a red node, as it is already known to be compromisable. In still other embodiments, a "pending red" node is displayed in a distinguishing way, different from the way both blue nodes and red nodes are displayed. For example, such a node may be displayed in purple color or by blinking its symbol. This enables the user to know which nodes were recently found to be compromisable by at least one attack method.

The issue of whether "pending red" nodes may be used for attacking other nodes and the issue of how a "pending red" node is shown in the networked system map are not necessarily related. For example, a campaign may use a "pending red" node for further attacks, while at the same time show it in the map as a blue node. Or a campaign may not use a "pending red" node for further attacks, while at the same time show it in the map as a red node.

When a penetration testing campaign ends, the user is typically presented with the attack vectors that were found by the campaign for the tested networked system. When a campaign carried out using the currently proposed solution determines multiple attack methods for compromising a given node and the compromising of the given node is part of an attack vector of the tested networked system, then the attack vector is actually a plurality of attack vectors for the tested networked system. Each one of the multiple ways of compromising the given node corresponds to a different version of the attack vector.

In some embodiments, all the versions of the same attack vector that differ only in the way to compromise the given node are presented simultaneously as different attack vectors. This has the advantage of presenting the user with the full picture on a single screen, making it easier to comprehend the results of the campaign. However, there is also a disadvantage—if the attack vector includes the compromising of multiple nodes each having multiple ways of being compromised, then the number of versions of the attack vector might become high. For example, if the attack vector includes the compromising of nodes A, B, C and D, and each of those four nodes has two ways of being compromised, then the number of attack vectors to display is 16. Simultaneously displaying a large number of attack vectors might clutter the screen and negate the advantage of having all alternatives visible together.

In other embodiments, an attack vector having multiple versions because it includes compromising at least one node that can be compromised in multiple ways, is displayed as a single attack vector with only one alternative being visible at a time. The alternative that is initially displayed is selected according to a pre-defined criterion. For example, the initially displayed attack method may be the one having the lowest cost of exploitation (i.e. the lowest cost for the attacker to use), or the one taking the attacker the lowest time to use. Any other criterion may also be used for selecting the initial alternative. The step of the attack vector that corresponds to compromising a node having multiple attack methods is marked in a way that makes the user aware of the fact that there are one or more additional alternatives for that step.

The user may see the other alternatives that are not initially displayed in the attack vector by explicitly asking for them. In some embodiments, the user may click on a step marked to have alternative(s) and in response the attack vector will change to show the next alternative for the clicked step. This may continue in a cyclic manner, where each additional clicking switches the attack vector to the next alternative. In other embodiments, the clicking on a step marked to have alternative(s) results in displaying a drop-down list of a textual descriptions of the available alternative(s) (e.g. "compromising node A from node B using stolen valid user credentials", "compromising node A using the ARP Spoofing technique", etc.), thus enabling the user to select one of the alternatives to appear in the displayed attack vector (including scrolling the list, if required). The order of the alternatives in the sequential cycling or in the drop-down list may be according to a pre-defined criterion. For example, any of the criteria mentioned in the previous paragraph may be used (i.e. based on costs of exploitation or based on times to use). Any other criterion may also be used for ordering the sequential cycling or the drop-down list.

Penetration testing systems can provide the user with one or more remediation recommendation at the end of a campaign. The recommendations are based on the attack vector(s) found by the campaign and are intended to block at least some of the attack vectors found to be available to attackers. If there is only a single attack vector, then determining a remediation recommendation is relatively straightforward—blocking any single step of the attack vector blocks the attack vector. The only question that remains is which of the steps of the single attack vector should be selected to be the one to block. Examples of criteria for such selection are disclosed in U.S. Pat. No. 10,382,473.

When there are multiple attack vectors, the determination of optimal remediation recommendations is more complicated, especially when the multiple attack vectors share steps. Penetration testing systems using the methods of the present disclosure are expected to generate a lot of cases of multiple attack vectors that share many of their steps and differ only in one or a few of their steps. See for example U.S. Pat. Nos. 10,382,473 and 10,637,883 (both of which are fully incorporated herein by reference), which disclose methods for determining optimal remediation recommendations in case of multiple attack vectors sharing steps.

Figure 2:
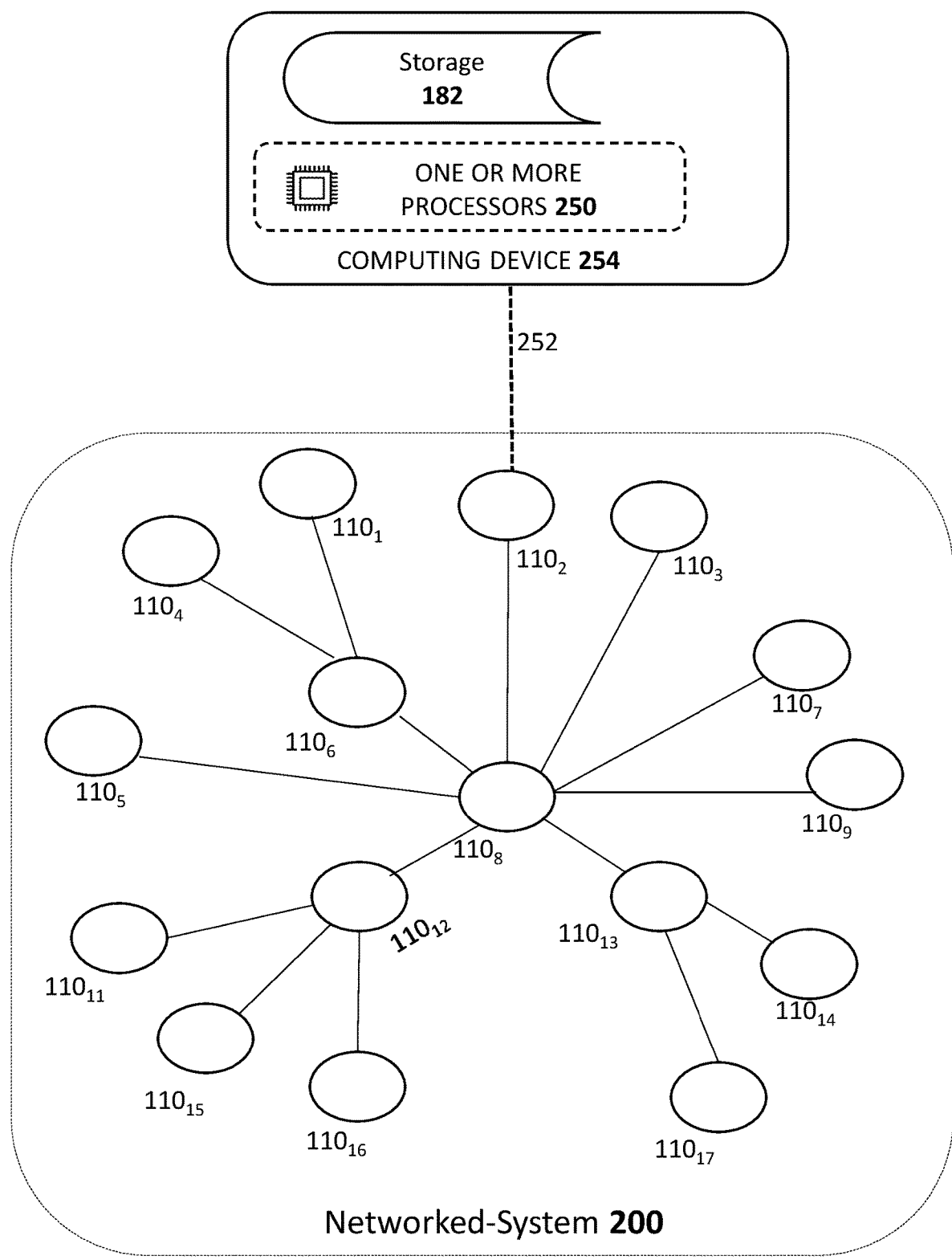
FIG. 2 shows a schematic illustration of a networked system that may be tested according to embodiments of the present invention, the networked system comprising multiple network nodes. The figure also shows a computing device in connection with the networked system.

Referring now to FIG. 2, an example of a penetration testing system is illustrated schematically in accordance with embodiments of the invention. The penetration testing system comprises a computing device 254—shown, in this non-limiting example as remote from the networked system—and a plurality of network nodes 110 of a networked system 200.

The number of network nodes 110 can be as few as two and as many as several hundred or several thousand. They can be connected hierarchically, peer-to-peer, hub-and-spoke, or in any combination of connections as long as each networked node 110 is connected to at least one other node 110.

In the example of FIG. 2, the remote computing device 254 is external to the networked system 200 and is in communication with the networked system 200 by an Internet connection 252. In this case, the physical location of remote computing device 254 is unimportant. It can be, by way of non-limiting examples, at a physical location belonging to a supplier or operator of a penetration testing system, in a 'cloud' server farm of an Internet services or cloud services provider, or it can be physically co-located with some or all of the network nodes 110.

Figure 3A:
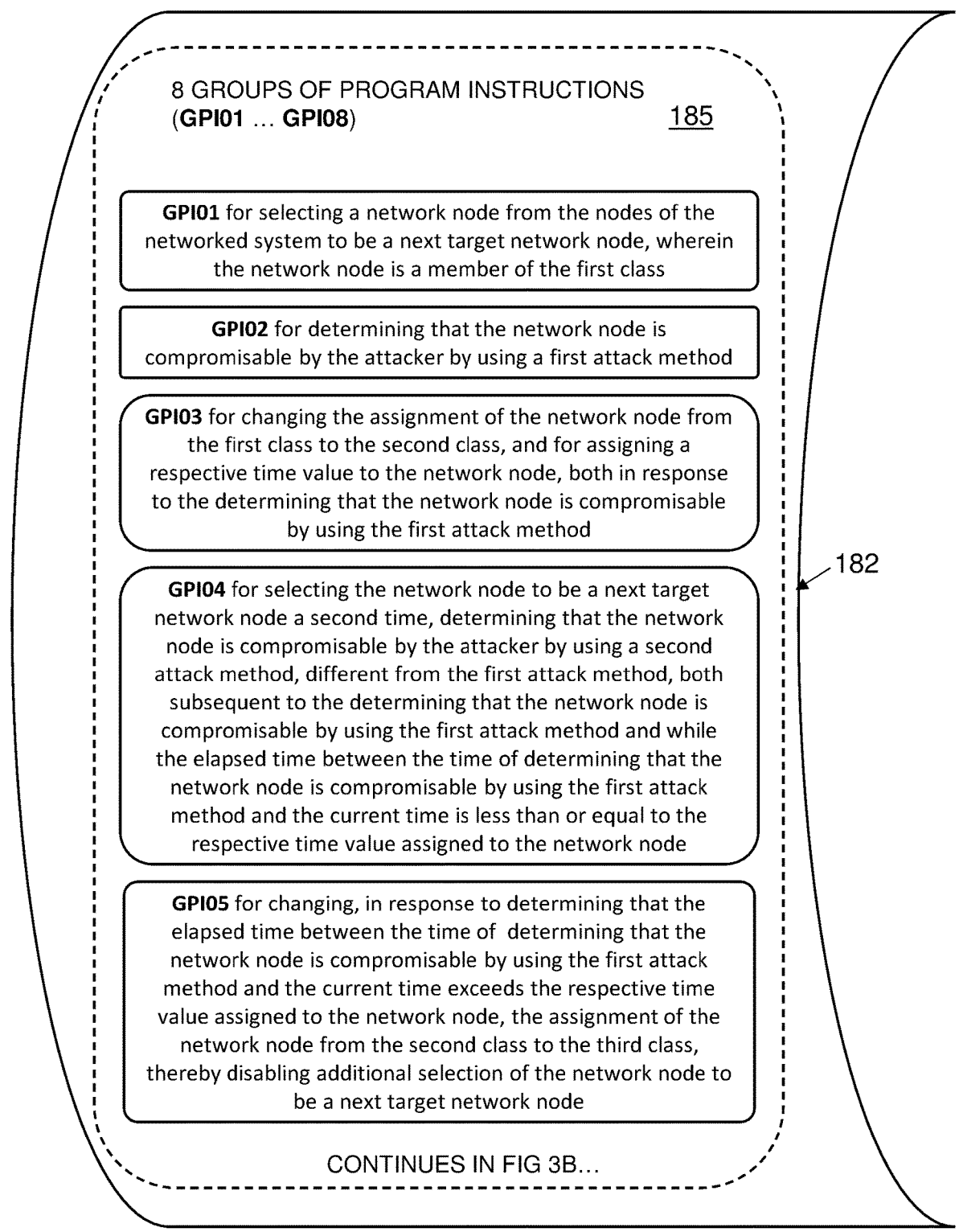
FIGS. 3A, 3B, 4, 5 and 6 show block diagrams of a non-transitory computer-readable storage medium installed at the computing device of FIG. 2, comprising groups of program instructions, according to embodiments of the present invention.
Figure 3B:
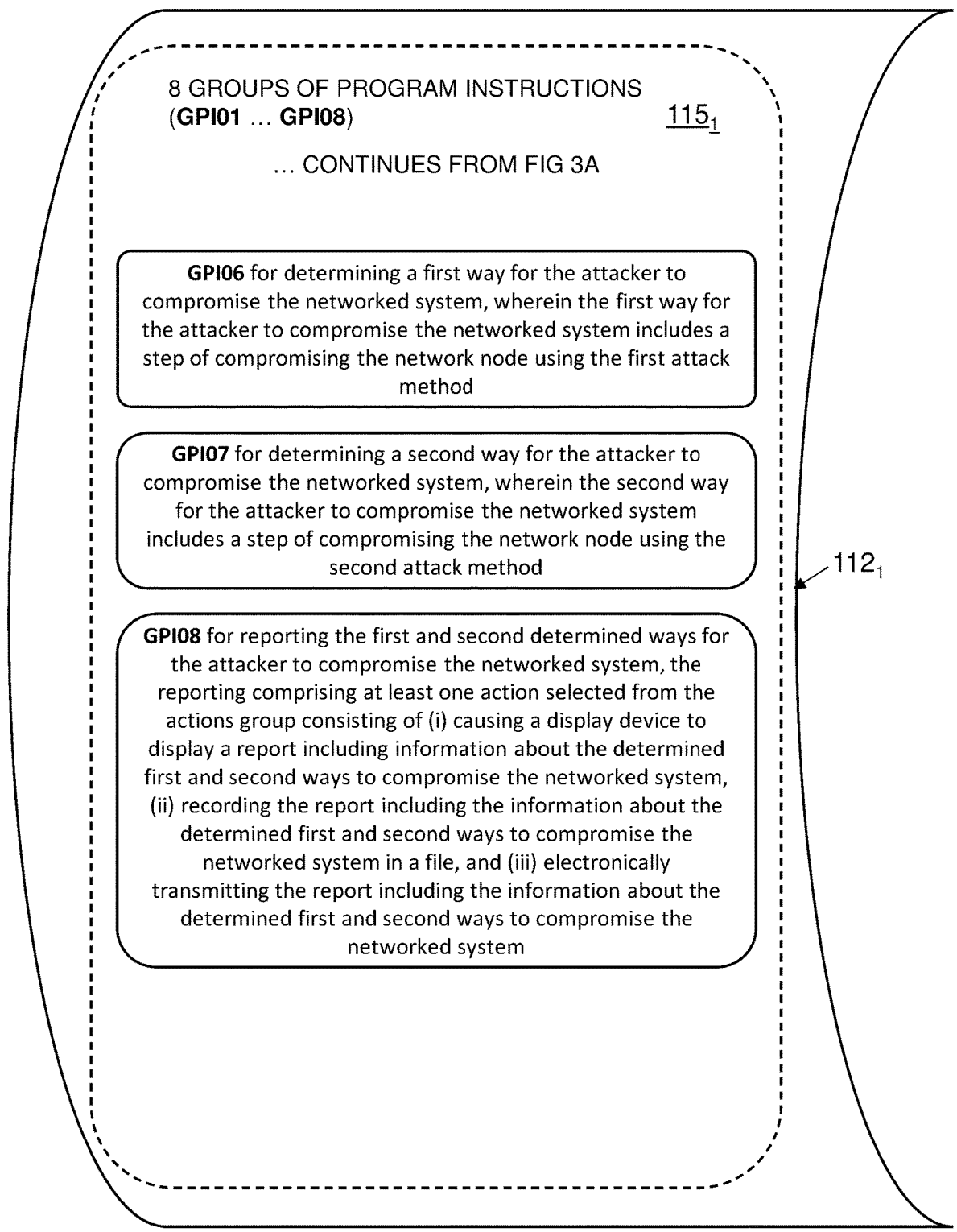

As illustrated schematically in FIG. 2, the exemplary penetration testing system comprises:
1. A computing device 254 comprising one or more processors 250, the computing device 254 in networked communication with at least some of the multiple network nodes 110 of the networked system 200.
2. A non-transitory computer-readable storage medium 182 for storage of program instructions 185 for execution by the one or more processors 250 of the computing device 254. The storage medium 182 is shown for convenience as being part of the computing device 254 but it can be anywhere as long as the one or more processors 250 can access and execute the instructions 185 stored therein. As illustrated in the block diagram of FIGS. 3A-B, the program instructions 185 comprise 8 groups of program instructions GPI01 ... GPI08 for execution by the one or more processors 250 of the computing device 254:

Program Instructions GPI01 for selecting a network node from the nodes of the networked system to be a next target network node, wherein the network node is a member of the first class (each network node that is a member of the first class at the current time is not currently known to be compromisable by the attacker).

Program instructions GPI02 for determining that the network node is compromisable by the attacker by using a first attack method. In some embodiments, in response to the determining that the network node is compromisable by using the first attack method, the penetration testing system starts to consider the network node to be under control of the attacker for the purpose of using the network node for compromising other network nodes.

Program Instructions GPI03 for changing the assignment of the network node from the first class to the second class (each given network node that is a member of the second class at the current time is currently known to be compromisable by the attacker, wherein the elapsed time between the time of determining that the given network node is compromisable and the current time is less than or equal to a respective time value), and for assigning a respective time value to the network node, both in response to the determining that the network node is compromisable by using the first attack method. In some embodiments, the respective time value is predetermined before starting the penetration testing. In some embodiments, the respective time value is based on an identity of the network node. In some embodiments, the respective time value is based on an importance level of the network node. In some embodiments, the respective time value is based on the time elapsed between the beginning of the penetration testing and the determining that the network node is compromisable by using the first attack method. In some embodiments, the respective time value assigned to the network node is based on a cost of exploitation of the first attack method.

Program Instructions GPI04 for selecting the network node to be a next target network node a second time, determining that the network node is compromisable by the attacker by using a second attack method, different from the first attack method, both subsequent to the determining that the network node is compromisable by using the first attack method and while the elapsed time between the time of determining that the network node is compromisable by using the first attack method and the current time is less than or equal to the respective time value assigned to the network node Program Instructions GPI05 for changing, in response to determining that the elapsed time between the time of determining that the network node is compromisable by using the first attack method and the current time exceeds the respective time value assigned to the network node, the assignment of the network node from the second class to the third class (each given network node that is a member of the third class at the current time is currently known to be compromisable by the attacker, wherein the elapsed time between the time of determining that the given network node is compromisable and the current time is more than a respective time value), thereby disabling additional selection of the network node to be a next target network node. In some embodiments, in response to the changing of the assignment of the network node from the second class to the third class, the penetration testing system starts to consider the network node to be under control of the attacker for the purpose of using the network node for compromising other network nodes. In some embodiments, in response to the determining that the network node is compromisable by using the first attack method and until the determining that the time elapsed between the time of determining that the network node is compromisable using the first attack method and the current time exceeds the respective time value assigned to the network node, the penetration testing system assigns a high priority to finding an additional attack method using which the network node is compromisable by the attacker. In some embodiments, after the determining that the network node is compromisable by using the first attack method and until the determining that the time elapsed between the time of determining that the network node is compromisable by using the first attack method and the current time exceeds the respective time value assigned to the network node, the network node is shown on a second display device as a network node that is not known to be compromisable by the attacker at the current time. In some embodiments, in response to the determining that the network node is compromisable by using the first attack method, the network node is shown on a second display device as a network node that is known to be compromisable by the attacker at the current time. In some embodiments, in response to the determining that the network node is compromisable by using the first attack method and until the determining that the time elapsed between the time of determining that the network node is compromisable by using the first attack method and the current time exceeds the respective time value assigned to the network node, the network node is shown on a second display device as a network node that is in a state that is different from both (i) the state of network nodes that are not known to be compromisable by the attacker at the current time, and (ii) the state of network nodes that are known to be compromisable by the attacker at the current time.

Program Instructions GPI06 for determining a first way for the attacker to compromise the networked system, wherein the first way for the attacker to compromise the networked system includes a step of compromising the network node using the first attack method Program Instructions GPI07 for determining a second way for the attacker to compromise the networked system, wherein the second way for the attacker to compromise the networked system includes a step of compromising the network node using the second attack method Program Instructions GPI08 for reporting the first and second determined ways for the attacker to compromise the networked system, the reporting comprising at least one action selected from the actions group consisting of (i) causing a display device to display a report including information about the determined first and second ways to compromise the networked system, (ii) recording the report including the information about the determined first and second ways to compromise the networked system in a file, and (iii) electronically transmitting the report including the information about the determined first and second ways to compromise the networked system. In some embodiments, the first and second determined ways for the attacker to compromise the networked system differ only in that the first determined way uses the first attack method for compromising the network node and the second determined way uses the second attack method for compromising the network node, and the reporting of the first and second determined ways for the attacker to compromise the networked system includes causing the display device to display the first and second determined ways as two separate ways to compromise the networked system. In some embodiments, the first and second determined ways for the attacker to compromise the networked system differ only in that the first determined way uses the first attack method for compromising the network node and the second determined way uses the second attack method for compromising the network node, and the reporting of the first and second determined ways for the attacker to compromise the networked system includes causing the display device to display the first and second determined ways as a single way for the attacker to compromise the networked system, where the displayed single way to compromise the networked system uses a single attack method that is one of the first and second attack methods for compromising the network node, the displaying of the single attack method indicating there is at least one other attack method that may be used for compromising the network node.

Figure 4:
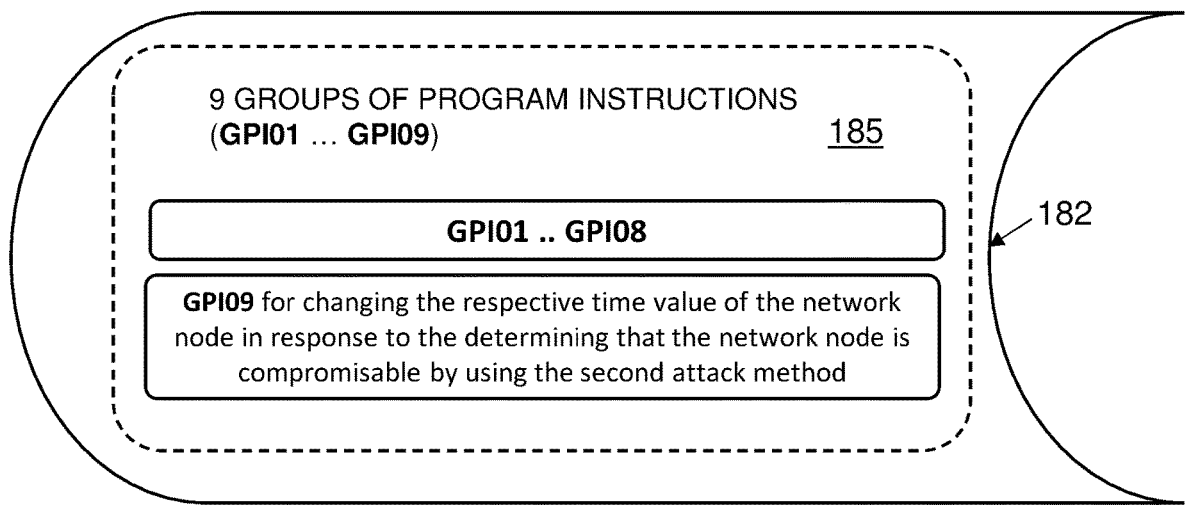

In some embodiments, the program instructions 185 can comprise an additional group of program instructions GPI09, as illustrated in FIG. 4, for execution by the one or more processors 250 of the computing device 254:

Program Instructions GPI09 for changing the respective time value of the network node in response to the determining that the network node is compromisable by using the second attack method. In some embodiments, the changing of the respective time value consists of increasing it by an amount equal to the time elapsed between the determining that the network node is compromisable by using the first attack method and the determining that the network node is compromisable by using the second attack method.

Figure 5:
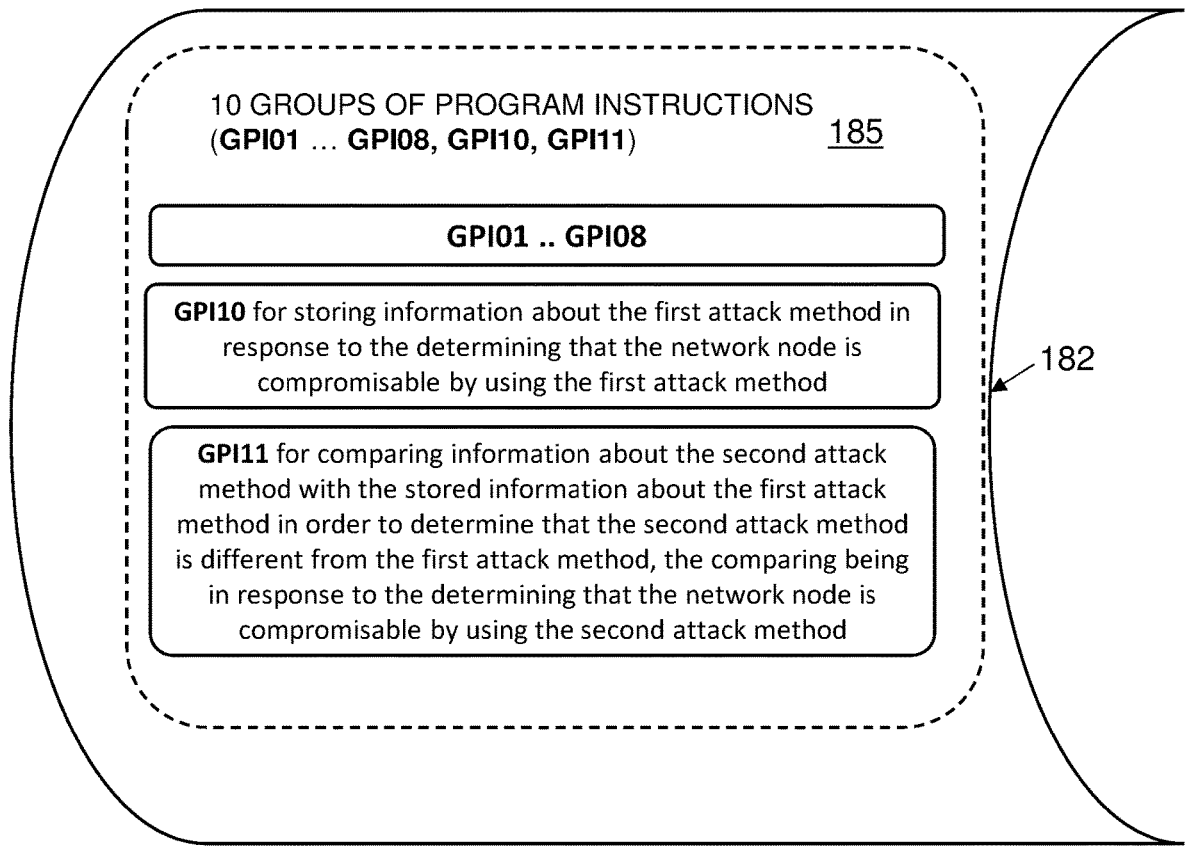

In some embodiments, the program instructions 185 can comprise 2 additional groups of program instructions GPI10, GPI11, as illustrated in FIG. 5, for execution by the one or more processors 250 of the computing device 254:

Program Instructions GPI10 for storing information about the first attack method in response to the determining that the network node is compromisable by using the first attack method.

Program Instructions GPI11 for comparing information about the second attack method with the stored information about the first attack method in order to determine that the second attack method is different from the first attack method, the comparing being in response to the determining that the network node is compromisable by using the second attack method.

Figure 6:
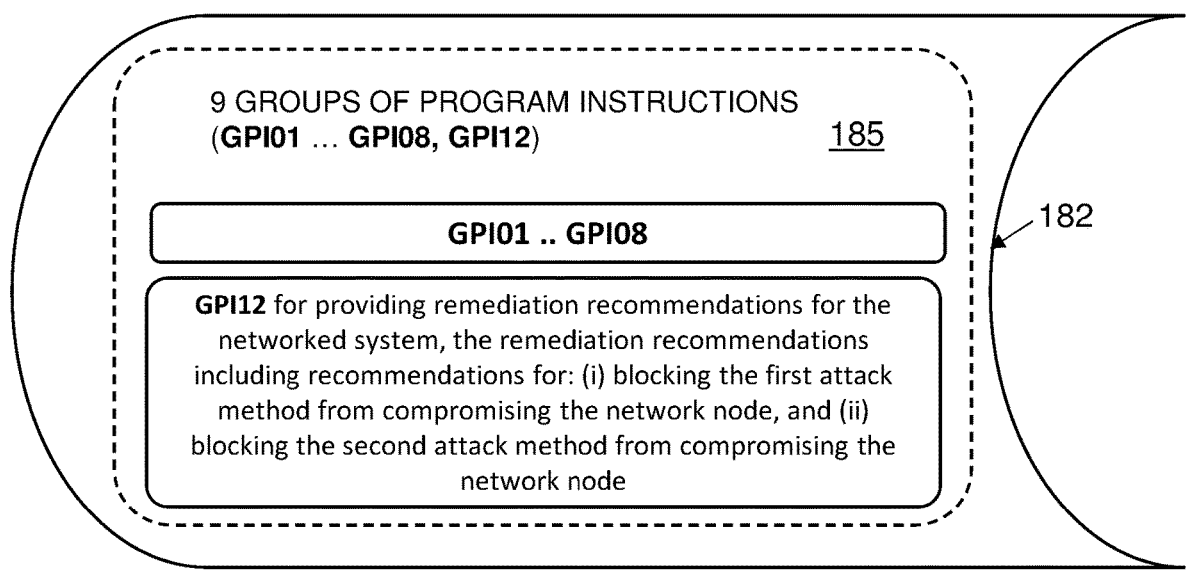

In some embodiments, the program instructions 185 can comprise an additional group of program instructions GPI12, as illustrated in FIG. 6, for execution by the one or more processors 250 of the computing device 254:

Program Instructions GPI12 for providing remediation recommendations for the networked system, the remediation recommendations including recommendations for: (i) blocking the first attack method from compromising the network node, and (ii) blocking the second attack method from compromising the network node.

In some embodiments, not all of the program instructions are executed. In some embodiments, any or all of the preceding embodiments can be combined—as an illustrative example, the program instructions 185 can include all of the program instructions described above GPI01 . . . GPI12.

Referring now to FIG. 7, a method is disclosed for carrying out a penetration testing campaign of a networked system 200 (for example, networked system 200 of FIG. 2) by a penetration testing system 100. In some embodiments, the penetration testing system is a simulated penetration testing system. In some embodiments, the penetration testing system is an actual attack penetration testing system. As illustrated by the flow chart in FIG. 7, the method comprises:

Step S01 selecting a network node from the nodes of the networked system to be a next target network node, wherein the network node is a member of the first class (each network node that is a member of the first class at the current time is not currently known to be compromisable by the attacker).

Step S02 determining that the network node is compromisable by the attacker by using a first attack method. In some embodiments, in response to the determining that the network node is compromisable by using the first attack method, the penetration testing system starts to consider the network node to be under control of the attacker for the purpose of using the network node for compromising other network nodes.

Step S03 changing the assignment of the network node from the first class to the second class (each given network node that is a member of the second class at the current time is currently known to be compromisable by the attacker, wherein the elapsed time between the time of determining that the given network node is compromisable and the current time is less than or equal to a respective time value), and assigning a respective time value to the network node, both in response to the determining that the network node is compromisable by using the first attack method. In some embodiments, the respective time value is predetermined before starting the penetration testing. In some embodiments, the respective time value is based on an identity of the network node. In some embodiments, the respective time value is based on an importance level of the network node. In some embodiments, the respective time value is based on the time elapsed between the beginning of the penetration testing and the determining that the network node is compromisable by using the first attack method. In some embodiments, the respective time value assigned to the network node is based on a cost of exploitation of the first attack method.

Step S04 selecting the network node to be a next target network node a second time, and determining that the network node is compromisable by the attacker by using a second attack method, different from the first attack method, both subsequent to the determining that the network node is compromisable by using the first attack method and while the elapsed time between the time of determining that the network node is compromisable by using the first attack method and the current time is less than or equal to the respective time value assigned to the network node.

Step S05 changing the assignment of the network node from the second class to the third class (each given network node that is a member of the third class at the current time is currently known to be compromisable by the attacker, wherein the elapsed time between the time of determining that the given network node is compromisable and the current time is more than a respective time value), in response to determining that the elapsed time between the time of determining that the network node is compromisable by using the first attack method and the current time exceeds the respective time value assigned to the network node, thereby disabling additional selection of the network node to be a next target network node. In some embodiments, in response to the changing of the assignment of the network node from the second class to the third class, the penetration testing system starts to consider the network node to be under control of the attacker for the purpose of using the network node for compromising other network nodes. In some embodiments, in response to the determining that the network node is compromisable by using the first attack method and until the determining that the time elapsed between the time of determining that the network node is compromisable using the first attack method and the current time exceeds the respective time value assigned to the network node, the penetration testing system assigns a high priority to finding an additional attack method using which the network node is compromisable by the attacker. In some embodiments, after the determining that the network node is compromisable by using the first attack method and until the determining that the time elapsed between the time of determining that the network node is compromisable by using the first attack method and the current time exceeds the respective time value assigned to the network node, the network node is shown on a second display device as a network node that is not known to be compromisable by the attacker at the current time. In some embodiments, in response to the determining that the network node is compromisable by using the first attack method, the network node is shown on a second display device as a network node that is known to be compromisable by the attacker at the current time. In some embodiments, in response to the determining that the network node is compromisable by using the first attack method and until the determining that the time elapsed between the time of determining that the network node is compromisable by using the first attack method and the current time exceeds the respective time value assigned to the network node, the network node is shown on a second display device as a network node that is in a state that is different from both (i) the state of network nodes that are not known to be compromisable by the attacker at the current time, and (ii) the state of network nodes that are known to be compromisable by the attacker at the current time.

Step S06 determining a first way for the attacker to compromise the networked system, wherein the first way for the attacker to compromise the networked system includes a step of compromising the network node using the first attack method.

Step S07 determining a second way for the attacker to compromise the networked system, wherein the second way for the attacker to compromise the networked system includes a step of compromising the network node using the second attack method.

Step S08 reporting the first and second determined ways for the attacker to compromise the networked system, the reporting comprising at least one action selected from the actions group consisting of (i) causing a display device to display a report including information about the determined first and second ways to compromise the networked system, (ii) recording the report including the information about the determined first and second ways to compromise the networked system in a file, and (iii) electronically transmitting the report including the information about the determined first and second ways to compromise the networked system.

In some embodiments, the first and second determined ways for the attacker to compromise the networked system differ only in that the first determined way uses the first attack method for compromising the network node and the second determined way uses the second attack method for compromising the network node, and the reporting of the first and second determined ways for the attacker to compromise the networked system includes causing the display device to display the first and second determined ways as two separate ways to compromise the networked system. In some embodiments, the first and second determined ways for the attacker to compromise the networked system differ only in that the first determined way uses the first attack method for compromising the network node and the second determined way uses the second attack method for compromising the network node, and the reporting of the first and second determined ways for the attacker to compromise the networked system includes causing the display device to display the first and second determined ways as a single way for the attacker to compromise the networked system, where the displayed single way to compromise the networked system uses a single attack method that is one of the first and second attack methods for compromising the network node, the displaying of the single attack method indicating there is at least one other attack method that may be used for compromising the network node.

Figure 8:
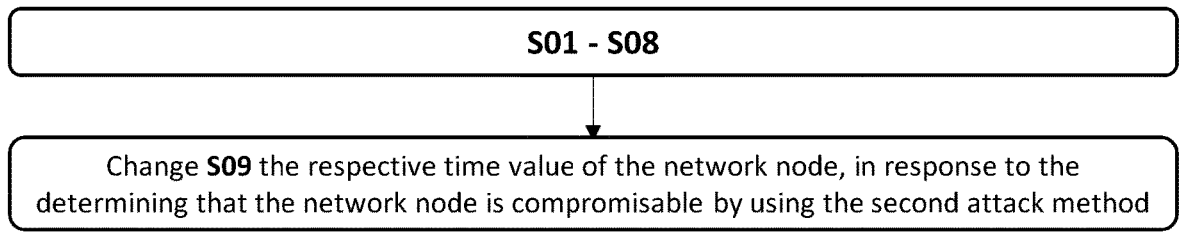

In some embodiments, the method includes an additional step S09, as illustrated in FIG. 8:

Step S09 changing the respective time value of the network node in response to the determining that the network node is compromisable by using the second attack method. In some embodiments, the changing of the respective time value consists of increasing it by an amount equal to the time elapsed between the determining that the network node is compromisable by using the first attack method and the determining that the network node is compromisable by using the second attack method.

Figure 9:
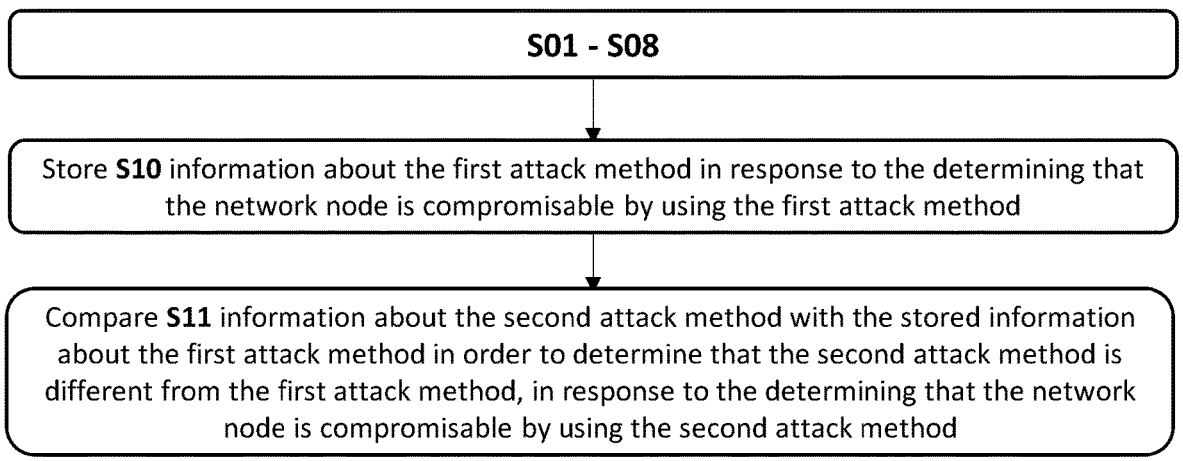

In some embodiments, the method includes two additional steps S10, S11, as illustrated in FIG. 9:

Step S10 storing information about the first attack method in response to the determining that the network node is compromisable by using the first attack method.

Step S11 comparing information about the second attack method with the stored information about the first attack method in order to determine that the second attack method is different from the first attack method, the comparing being in response to the determining that the network node is compromisable by using the second attack method.

Figure 10:
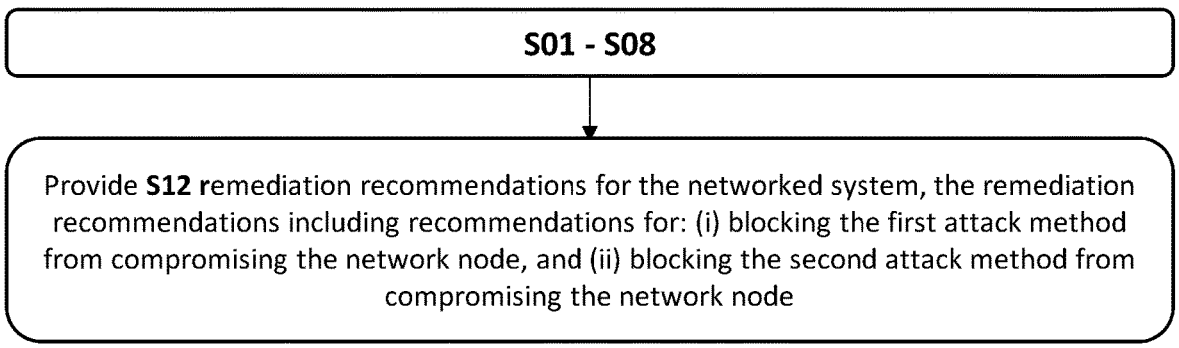

In some embodiments, the method includes an additional step S12, as illustrated in FIG. 10:

Step S12 providing remediation recommendations for the networked system, the remediation recommendations including recommendations for: (i) blocking the first attack method from compromising the network node, and (ii) blocking the second attack method from compromising the network node.

In some embodiments, not all of the method steps are performed. In some embodiments, any or all of the method steps described above can be combined. In an illustrative example, the method can comprise all of steps S01 . . . S12.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.
5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.
6. "network node of a networked system" or "node of a networked system"—Any computing device or peripheral device that belongs to the networked system.
7. "security vulnerability of a network node" or "vulnerability of a network node"—
    A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, allowing users to log into the network node based only on knowing user credentials without requiring a second authenticating factor, and the like.
    A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition in the networked system).
8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.
    A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.
9. "validating a vulnerability" or "validating a potential vulnerability" (for a given network node or for a given networked system)—Verifying that the vulnerability compromises the given network node or the given networked system under the conditions currently existing in the given network node or the given networked system.
    The validation of the vulnerability may be achieved by actively attempting to compromise the given network node or the given networked system and then checking if the compromising attempt was successful. Such validation is referred to as "active validation".
    Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.
10. "vulnerability management"—A cyclical practice of identifying, classifying, remediating, and mitigating vulnerabilities of network nodes in a networked system.
11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "a penetration testing campaign" or just "a campaign"—A specific run of a specific test of a specific networked system by the penetration testing system.

An execution of a campaign ends by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

22. "pre-defined scenario", "pre-defined test scenario", "scenario template" or "template scenario"—A scenario that exists in storage accessible to a penetration testing system before the time a campaign is started, and can be selected by a user of the penetration testing system for defining a campaign of penetration testing. A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

23. "attacker" or "threat actor"—An entity, whether a single person, a group of persons or an organization, that might conduct an attack against a networked system by penetrating it for uncovering its security vulnerabilities and/or for compromising it.

24. "a type of an attacker"—A classification of the attacker that indicates its main incentive in conducting attacks of networked systems. Typical values for a type of an attacker are a state-sponsored attacker, a professional cyber criminal attacker, an amateur cyber criminal attacker and an insider attacker.

25. "a state-sponsored attacker"—An attacker that has a high level of expertise in conducting cyber attacks and usually conducts his attacks on behalf of a state.

26. "a professional cyber criminal attacker"—An attacker that has a high level of expertise in conducting cyber attacks and usually conducts his attacks not on behalf of a state.

27. "an amateur cyber criminal attacker"—An attacker that has a low level of expertise in conducting cyber attacks.

28. "an insider attacker"—An attacker that is an employee or otherwise works for the organization owning the networked system being attacked.

29. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

30. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

31. "a lateral movement strategy of an attacker"—The lateral movement strategy of an attacker is the decision logic applied by the attacker of a campaign for selecting the next network node to try to compromise (herein also referred to as "the target node").

During a penetration testing campaign, the attacker is assumed to make progress by an iterative process in which in each iteration he selects the next node to attack, based on the group of network nodes he already controls (i.e. that are already compromised) and possibly also based on other considerations. If the attack on the selected node is successful, that node is added to the group of nodes that are already compromised. If the attempt to compromise the selected node fails, the target node remains in its previous status of not yet being compromised. In both cases, once the result of an iteration is determined (i.e. either a success or a failure in compromising the target node selected for the iteration), another node is selected to be the next target node and a new iteration of the campaign starts, attempting to compromise the new target node.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore, in this disclosure, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is (i) either an immediate neighbor of or reachable from the last network node that was compromised, and (ii) is not yet compromised (provided such neighbor node exists).

Another simple example is a "breadth search" strategy. In such strategy, the next network node to try to compromise is a not-yet-compromised network node whose distance from the first node compromised by the campaign is the smallest possible. The distance between two network nodes is the number of network nodes located between the two network nodes on the shortest path between the two network nodes, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource and picking the first node on this path (which must be a not-yet-compromised node) to be the next node to try to compromise. Note that if the shortest path has a length of one (which happens when the specific node is an immediate neighbor of an already compromised node), then the next node to try to compromise is the specific node containing the desired resource. Another example of a lateral movement strategy is a strategy that gives priority to network nodes satisfying a specific condition, for example nodes that are known to have a specific weakness such as running the Windows XP operating system, or nodes that are known to have a specific value for an attacker such as storing a large number of Excel files. In such case the next node to try to compromise is a not-yet-compromised node that satisfies the condition and is also an immediate neighbor of an already compromised node (if such node exists).

Typically, an attacker uses a single lateral movement strategy during an attack.

32. "network nodes A and B are immediate neighbors of each other"—Network nodes A and B have a direct communication link between them that does not pass through any other network node.

33. "network node A can communicate with network node B" or "network node B is reachable from network node A"—Network node A can send information (e.g. commands and/or data) to network node B. The sent information may be passed directly between the two network nodes without passing through any other network node, or it may be passed through one or more other nodes.

The communication channel between the two network nodes may be a two-way communication channel, with which each of the two network nodes can send information to the other one. Alternatively, the communication channel may be a one-way communication channel, enabling network node A to send information to network node B, but not the other way around.

34. "accessing a network node"—Communicating with the network node in a way that provides the accessing entity an ability to perform an operation on one or more resources of the network node. For example, when a user logs into a first network node from a second network node, the second network node is accessing the first network node. As another example, when a file is read by a first network node from a shared folder in a second network node, the first network node is accessing the second network node. When a first node is accessing a second node, the second node is being accessed by or from the second network node.

35. "penetration testing by simulation" or "simulated penetration testing"—Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

36. "penetration testing by actual attack" or "actual attack penetration testing" or "penetration testing by actual exploit" or "actual exploit penetration testing"—Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

37. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

38. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

39. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

40. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

41. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

42. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

43. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

44. "internal factual data of/in a network node" or "internal facts of a network node"—Facts related to the network node which can only be directly found by code executing by a processor of the network node.

Examples of factual data of a network node are the version of the firmware of a solid-state drive installed in the network node, the hardware version of a processor of the network node, and the amount of free space in a local disk of the network node.

45. "a resource of a network node" or "an asset of a network node"—A file in the network node, a folder in the network node, credentials of a user residing in the network node (the credentials not necessarily applying to the network node containing the credentials), a peripheral device of the network node or a communication device accessible to the network node.

46. "a resource of a networked system" or "an asset of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

47. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

Access rights may be conditioned on the user authenticating himself before getting the rights to perform the relevant operations. A user is said to have certain access rights regardless if those rights are conditioned on authentication or not. The term "access rights" in the plural may be used even if only a single right is involved (e.g. when a user has only a right to read a single file in the network node).

48. "user credentials"—An attestation issued to the user for authenticating himself in order to be allowed to use access rights granted to him in one or more network nodes. User credentials may include a user name, a user ID, a password, any combination of the three, or any other data item which is expected not to be available to other people.

49. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

50. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

51. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

52. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

53. "session-hijacking attack"—a cyber-attack where a valid communication session between two network nodes in a networked system is used by an attacker to gain unauthorized access to information or services in the networked computer system.

54. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

55. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

56. "administrator of a network node"—Any person that is authorized, among other things, to define or change at least one rule controlling at least one of an access right, a permission, a priority and a configuration in the network node.

57. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

58. "achieving full control of a computing device"—For a multi-user computing device that distinguishes between administrator and non-administrator users, logging into the computing device with administrator access rights. For a single-user computing device, logging into the computing device as the single user.

59. "privilege escalation"—An act of exploiting a bug, a design flaw or a configuration oversight in an operating system or a software application in order to gain additional access rights to resources in a network node on top of previously held access rights (if any). The result of applying privilege escalation in a network node is that the entity applying it (whether a legitimate user or an illegitimate attacker) can now perform unauthorized actions that were not available to him prior to applying the privilege escalation.

60. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

61. "termination condition of a campaign", "terminating condition of a campaign", "halting condition of a campaign", "stopping condition of a campaign", "termination criterion of a campaign", "terminating criterion of a campaign", "halting criterion of a campaign", or "stopping criterion of a campaign"—A Boolean condition defined for the campaign that if and when satisfied causes the halting of the campaign, even if the goal of the attacker of the campaign was not yet reached.

For the sake of the above defined terms the singular and plural forms are equivalent—"criterion" and "criteria" are used interchangeably, and so are "condition" and "conditions".

The condition may be a simple condition (for example "the number of already compromised nodes in the tested networked system is five or more") or a compound condition composed of multiple simple conditions and one or more logical operators (for example "a file named company budget.xls is exported out of the tested networked system from any network node, or at least ten files were encrypted by the attacker in the network node used by the organization's CFO"). A halting condition of a campaign can be defined for all types of penetration testing systems. For an actual attack penetration testing system, the halting condition is typically associated with the state or status of the tested networked system. For penetration testing systems that do not attempt to compromise the tested networked system, the halting condition is typically associated with a state or status of a simulation of the networked system or may be evaluated based on such state or status. However, the above is not limiting in any way, and the halting condition may depend on any factor that is available to the penetration testing system during the campaign, including on factors that are independent of the state and the status of the campaign, for example on the amount of time spent on running the campaign or on the time of day.

62. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.

Note that changing the access rights of a file is not considered damaging the file.

63. "damaging a network node"—Carrying out an operation related to the network node that is not allowed by the owner of the network node and that causes a change of state in the network node or in some resource related to the network node.

Examples of operations damaging a network node are: (i) damaging a file residing in the network node, (ii) exporting a file (or a portion of it) residing in the network node out of the network node, (iii) shutting down the network node, (iv) shutting down or disabling a service provided by the network node, or (v) closing or disabling a software application executing in the network node.

64. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

65. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

66. "a defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one countermeasure.

67. "executable file"—A computer file that contains instructions that may be executed by a computer. An executable file may be a binary file (e.g. when containing machine code) or a text file (e.g. when containing interpreted scripting code).

68. "text file"—A computer file that includes mostly text. A text file may include some non-textual content. For example, Microsoft Word files may include some non-textual control characters or metadata but are still considered text files.

69. "binary file"—Any computer file that is not a text file. A binary file may include some textual content. For example, executable files containing machine code may include textual strings that are part of the executable code but are still considered binary files.

70. "opening a file"—If the file is an executable file, then opening it means executing it. If the file is not an executable file, then opening it means creating by the operating system at least one data structure associated with the file, the one or more data structures used for enabling a software application to read or write data from/to the file.

71. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

72. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

73. "setting a campaign to be based on a pre-defined scenario"—Selecting the values of the information items of the campaign at least partially according to the corresponding values of the information items of the pre-defined scenario. The setting includes assigning to every information item of the campaign the value of the corresponding information item of the pre-defined scenario. Optionally, after the assigning, the setting may further include manually overriding and changing one or more of the assigned values of the information items of the campaign.

74. "random selection"—A selection that depends on a random or pseudo-random factor. Different possible outcomes in a random selection do not necessarily have the same probabilities of being selected.

75. "hash function"—any function that maps data of fixed or arbitrary size to data of fixed size, where the output in smaller in size than the input. For example, the function D=A XOR B XOR C (where A, B, C and D are all 32 bit unsigned numbers) is a hash function, as it maps an input of size 3×32=96 bits to an output of size 32 bits. The output of a hash function is called "a hash value" or simply "a hash".

76. "broadcast domain"—A logical division of a networked system, in which all network nodes can reach each other by broadcasting at the data link layer. In other words, each network node in a broadcast domain can transmit a data link broadcast message that is addressed to all other network nodes within its broadcast domain.

77. "data packet", "network packet" or "network message"—A formatted unit of data carried by a computer network.

78. "data packet of a network node"—A data packet that is either sent by the network node or received by the network node.

79. "attacker step"—One or more actions performed by an attacker of a networked system in order to achieve a certain result. An attacker step may be included in an actual or potential attempt of an attacker to compromise a networked system that includes one or more attacker steps. Performing a given attacker step may be conditioned on certain achievements being already achieved by the attacker prior to carrying out the given attacker step.

An example of an attacker step that consists of a single action is the recovering of a password enabling access to a given network node from a known hash code (e.g. using a pre-compiled dictionary of hash codes and their corresponding passwords, when the algorithm of hashing is known). In this example, the attacker step is conditioned on a prior achievement by the attacker of finding out the hash code.

An example of an attacker step that consists of multiple actions is the recovering of a password enabling access to a given network node based on an ability to remotely execute arbitrary code in the given network node (e.g. remotely executing in the given network node code that obtains a hash code of a password enabling access to the given network node, and then recovering the corresponding password from its hash code as in the previous example). In this example, the attacker step is conditioned on a prior achievement by the attacker of obtaining an ability to remotely execute arbitrary code in the given network node.

As can be seen from the above examples, the breaking out of a potential attack plan into attacker steps is somewhat arbitrary. The second example above including a single attacker step consisting of two actions could have been defined to include two separate attacker steps, each including a single action—the first attacker step consisting of remotely executing in the given network node code that obtains the hash code, and the second attacker step consisting of recovering the password from its hash code.

80. "attack method for compromising a network node"—An attacker step which achieves a result of compromising the network node.

81. "attack vector"—A set of network nodes connected by attacker steps. The set represents a method for an attacker to move from one or more starting network nodes to an ending network node. Alternatively, an attack vector can be a set of network nodes connected by vulnerabilities that can be exploited by attacker steps. In this case too, the set represents a method for the attacker to move from one or more starting network nodes to an ending network node.

The starting network node(s) of an attack vector are the network node(s) from which the attacker starts its attack. The ending network node of an attack vector is a network node of the tested networked system whose compromising by the attacker results in achieving the goal set for the attacker in the current penetration testing campaign. The attacker can make progress towards the goal by moving from network node to network node in the attack vector by carrying out the relevant steps exploiting the relevant vulnerabilities.

A starting network node of an attack vector may be a network node of the tested networked system that is assumed to be already compromised at the beginning of the campaign. Alternatively, a starting network node may be a "dummy node" that represents the world outside the tested networked system. This is useful when it is not assumed that any network nodes of the tested networked system are already compromised when starting the campaign. Another way for representing an attack vector that starts outside the tested networked system without explicitly displaying a dummy node is to display the attack vector as starting with an attacker step or with a vulnerability that can be exploited by an attacker step, rather than with a network node.

An attack vector may be represented by a graph, where network nodes are represented by graph nodes and steps or vulnerabilities are represented by graph edges. However, this is not the only way of using a graph for representing an attack vector. As one example, steps or vulnerabilities may also be represented by graph nodes, in which case the graph nodes of the attack vector graph alternate between representing network nodes and representing steps/vulnerabilities. Also, a graph is not the only way of representing an attack vector. Other forms, such as a textual list, may also be used for that purpose.

82. "remediation action" or just "remediation"—An action that improves the security of a networked system by making one or more attacker steps practically unavailable, more expensive, more difficult, less efficient and/or less useful for attackers of the networked system.

An example of a remediation action that makes only a single attacker step practically unavailable to attackers is the installing of a defensive measure applicable only to a single network node (e.g. installing in a single network node a software utility that locally requires fingerprints identification on top of requiring a password in order to allow access).

An example of a remediation action that makes multiple attacker steps practically unavailable to attackers is the replacing of a common algorithm or a common method used in multiple network nodes of the networked system by an improved algorithm or method (e.g. the global replacing of a simple password hash code calculation algorithm by an improved password hash code algorithm that uses salt in its calculation). In such case, each given network node benefiting from the improved algorithm corresponds to a different attacker step targeting the given network node.

A remediation action that makes the one or more attacker steps practically unavailable does not necessarily make the one or more attacker steps completely unavailable to the attackers. If an action makes the one or more attacker steps too costly for the attackers to use (i.e. makes the cost of exploitation of the one or more attacker steps so high that there is very low probability that the attackers would use them), then the action is considered to make the one or more attacker steps practically unavailable to the attackers and therefore is a remediation action. Another example of a remediation action that does not make the one or more attacker steps completely unavailable to the attackers is an action of replacing an encryption algorithm using a short key with a similar encryption algorithm using a longer key. This may result in the deciphering of the encrypted data by an attacker taking a much longer time than before. This in turn makes the one or more attacker steps less efficient to use, and therefore such action is considered to be a remediation action.

83. "sub-goal" or "achievement"—A result or ability obtained by an attacker by successfully performing an attacker step against a networked system, where the attacker was not in possession of the result or ability before performing the attacker step.

For example, obtaining a password enabling access to a given network node of the networked system is a possible sub-goal. Such sub-goal may be obtained by an attacker by carrying out the attacker step "recovering of a password to the given network node from a known password hash code" or the attacker step "exporting out of the networked system of a file containing all credentials for the local network in which the given network node resides". As another example, exporting a specific file (e.g. an Excel file containing a company's budget) out of the networked system is a possible sub-goal. As still another example, compromising a given network node so that the attacker gets full control of it is a possible sub-goal. It should be noted that every resource of a tested networked system corresponds to a possible sub-goal of obtaining, controlling or damaging that resource.

A special case of a sub-goal is a dummy sub-goal representing a state in which an attacker has no possession of any result or ability which is not available to all. A dummy sub-goal is assumed to be achievable by any attacker even before carrying out any attacker step.

In some cases, a sub-goal may be automatically obtained by an attacker following the obtaining of another sub-goal, without having to perform any additional attacker step. For example, the sub-goal "compromise either node X or node Y" is automatically obtained once the sub-goal "compromise node X" was obtained, without having to perform any additional attacker step. In such case it can be assumed that the sub-goal is obtained by a dummy attacker step that does nothing.

84. "importance of a sub-goal in a networked system"—A measure of how important it is for the owner of the networked system to protect the sub-goal against attack.

For example, a sub-goal that is included in a large number of paths of attack that are available to attackers of the networked system is more important to protect than a sub-goal included only in a single path of attack (assuming all other factors associated with the two sub-goals are equal).

The importance of sub-goals may be represented by a numeric score within a given range, typically (but not necessarily) with a higher score indicating a sub-goal having a higher importance. For example, the given range may be [0 . . . 10], with the importance of a first sub-goal included in three paths of attack being 8, and the importance of a second sub-goal included in a single path of attack being 2. Alternatively, a lower score may represent a lower importance sub-goal.

85. "importance of a network node in a networked system"—A measure of how important it is for the owner of the networked system to protect the network node against attack. For example, a network node that is the organization's CFO's personal network node is more important to protect that than a network node used by a junior software programmer.

The importance of network nodes may be represented by a numeric score within a given range, typically (but not necessarily) with a higher score indicating a network node having a higher importance. For example, the given range may be [0 . . . 10], with the importance of the CFO's network node being 10, and the importance of the network nodes of all junior programmers being 4. Alternatively, a lower score may represent a lower importance network node.

86. "blocking an attacker step", "blocking an attack method", "blocking a vulnerability", "blocking a way for an attacker to compromise"—Making the attacker step or the attack method or the exploitation of the vulnerability or the way to compromise (as the case may be) practically unavailable, more expensive, more difficult, less efficient and/or less useful to attackers. The blocking of the attacker step or the attack method or the exploitation of the vulnerability or the way to compromise is done by implementing one or more remediation actions.

87. "cost of exploitation of an attacker step", "cost of exploitation of an attack method", "cost of exploitation of a vulnerability"—A measure of how difficult or expensive it is for an attacker to use the attacker step or to use the attack method or to exploit the vulnerability (as the case may be). For example, an attacker step using the method known as "ARP Spoofing" is costlier for the attacker than an attacker step using a method taken from a publicly available exploit kit. The cost of exploitation may be represented by a numeric score within a given range, typically (but not necessarily) with a higher score indicating a costlier attacker step. For example, the given range may be [0 . . . 10], with the cost of exploitation using ARP Spoofing being 7, and the cost of exploitation using a method taken from a publicly available exploit kit being 2. Alternatively, a lower score may represent a costlier attacker step.

88. "cost of remediation of an attacker step", "cost of remediation of an attack method", "cost of remediation of a vulnerability"—A measure of how difficult or expensive it is for the organization owning the networked system to which the attacker step or the attack method or the exploitation of the vulnerability is applied to block the attacker step or the attack method or the exploitation of the vulnerability (as the case may be). For example, an attacker step that can be blocked by simply installing a security patch for a software application (e.g. Microsoft Word) is much less costly to block than an attacker step that requires buying and installing a new router in order to split an existing sub-network into two different sub-networks.

The cost of remediation may be represented by a numeric score within a given range, typically (but not necessarily) with a higher score representing a costlier attacker step. For example, the given range may be [0 . . . 10], with the cost of a remediation action requiring only installing a patch being 1, and the cost of a remediation action requiring a new router being 8. Alternatively, a lower score may represent a costlier attacker step.

89. "probability of success of an attacker step", "probability of success of an attack method", "probability of success of a vulnerability"—A measure of how probable is it that execution of the attacker step or execution of the attack method or an attempt to exploit the vulnerability (as the case may be) by the attacker will succeed in achieving the result that the attacker step or the attack method is intended to achieve or will succeed in compromising the networked system, taking into account currently available knowledge regarding the state of the attacked networked system. For example, an attacker step that is based on exploiting a known Windows 7 vulnerability may have high probability of success when applied to a network node having the original version of the OS installed, while having a low probability of success when applied to a network node in which a certain security patch had also been installed.

Typically, probabilities of success are expressed in percentages in the range of 0% to 100%. Alternatively, the probabilities of success may be represented by numeric values in the range of zero to one, where zero corresponds to 0% and one corresponds to 100%. However, any other numerical scale may be used for representing probabilities of success, provided that the scale is a monotonically increasing or monotonically decreasing function of how probable is it that the attacker step will succeed in achieving its sub-goal.

90. "a Boolean condition"—A statement that can have a value of either true or false. If the statement is true, we say that the Boolean condition is satisfied. If the statement is false, we say that the Boolean condition is not satisfied.

91. "a subset/subgroup of a given set/group" or "a subset/sub-group of a given set/group"—A set/group that satisfies the condition that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

92. "a proper subset/subgroup of a given set/group" or "a proper sub-set/sub-group of a given set/group"—A subset/subgroup of the given set/group that is not equal to the given set/group. In other words, there is at least one member of the given set/group that is not a member of the subset/subgroup.

93. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

94. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

The invention claimed is:

1. A method of carrying out penetration testing of a networked system by a penetration testing system to determine one or more ways for an attacker to compromise the networked system, wherein the penetration testing system assigns network nodes of the networked system to disjoint classes based on current information about the compromisability of the network nodes, the classes consisting of (i) a first class, wherein each network node that is a member of the first class at the current time is not currently known to be compromisable by the attacker, (ii) a second class, wherein each given network node that is a member of the second class at the current time is currently known to be compromisable by the attacker, and wherein the elapsed time between the time of determining that the given network node is compromisable and the current time is less than or equal to a respective time value, and (iii) a third class, wherein each given network node that is a member of the third class at the current time is currently known to be compromisable by the attacker, and wherein the elapsed time between the time of determining that the given network node is compromisable and the current time is more than a respective time value, the method comprising:
  a. selecting a network node from the nodes of the networked system to be a next target network node, wherein the network node is a member of the first class;
  b. determining that the network node is compromisable by the attacker by using a first attack method;
  c. in response to the determining that the network node is compromisable by using the first attack method:
    i. changing the assignment of the network node from the first class to the second class; and
    ii. assigning a respective time value to the network node;
  d. subsequent to the determining that the network node is compromisable by using the first attack method and while the elapsed time between the time of determining that the network node is compromisable by using the first attack method and the current time is less than or equal to the respective time value assigned to the network node, performing the following:
    i. selecting the network node to be a next target network node a second time; and
    ii. determining that the network node is compromisable by the attacker by using a second attack method, different from the first attack method;
  e. in response to determining that the elapsed time between the time of determining that the network node is compromisable by using the first attack method and the current time exceeds the respective time value assigned to the network node, changing the assignment of the network node from the second class to the third class, thereby disabling additional selection of the network node to be a next target network node;
  f. determining a first way for the attacker to compromise the networked system, wherein the first way for the attacker to compromise the networked system includes a step of compromising the network node using the first attack method;
  g. determining a second way for the attacker to compromise the networked system, wherein the second way for the attacker to compromise the networked system includes a step of compromising the network node using the second attack method; and
  h. reporting the first and second determined ways for the attacker to compromise the networked system, the reporting comprising at least one action selected from the actions group consisting of (i) causing a display device to display a report including information about the determined first and second ways to compromise the networked system, (ii) recording the report including the information about the determined first and second ways to compromise the networked system in a file, and (iii) electronically transmitting the report including the information about the determined first and second ways to compromise the networked system.

2. The method of claim 1, wherein the penetration testing system is a simulated penetration testing system.

3. The method of claim 1, wherein the penetration testing system is an actual attack penetration testing system.

4. The method of claim 1, wherein the respective time value assigned to the network node is predetermined before starting the penetration testing.

5. The method of claim 1, wherein the respective time value assigned to the network node is based on an identity of the network node.

6. The method of claim 1, wherein the respective time value assigned to the network node is based on an importance level of the network node.

7. The method of claim 1, wherein the respective time value assigned to the network node is based on the time elapsed between the beginning of the penetration testing and the determining that the network node is compromisable by using the first attack method.

8. The method of claim 1, wherein the respective time value assigned to the network node is based on a cost of exploitation of the first attack method.

9. The method of claim 1, further comprising:
  i. in response to the determining that the network node is compromisable by using the second attack method, changing the respective time value of the network node.

10. The method of claim 9, wherein the changing of the respective time value of the network node consists of increasing the respective time value by an amount equal to the time elapsed between the determining that the network node is compromisable by using the first attack method and the determining that the network node is compromisable by using the second attack method.

11. The method of claim 1, further comprising:
  i. in response to the determining that the network node is compromisable by using the first attack method, storing information about the first attack method; and
  j. in response to the determining that the network node is compromisable by using the second attack method, comparing information about the second attack method with the stored information about the first attack method in order to determine that the second attack method is different from the first attack method.

12. The method of claim 1, wherein, in response to the determining that the network node is compromisable by using the first attack method, the penetration testing system starts to consider the network node to be under control of the attacker for the purpose of using the network node for compromising other network nodes.

13. The method of claim 1, wherein, in response to the changing of the assignment of the network node from the second class to the third class, the penetration testing system starts to consider the network node to be under control of the attacker for the purpose of using the network node for compromising other network nodes.

14. The method of claim 1, wherein, in response to the determining that the network node is compromisable by using the first attack method and until the determining that the time elapsed between the time of determining that the network node is compromisable using the first attack method and the current time exceeds the respective time value assigned to the network node, the penetration testing system assigns a high priority to finding an additional attack method using which the network node is compromisable by the attacker.

15. The method of claim 1, wherein, after the determining that the network node is compromisable by using the first attack method and until the determining that the time elapsed between the time of determining that the network node is compromisable by using the first attack method and the current time exceeds the respective time value assigned to the network node, the network node is shown on a second display device as a network node that is not known to be compromisable by the attacker at the current time.

16. The method of claim 1, wherein, in response to the determining that the network node is compromisable by using the first attack method, the network node is shown on a second display device as a network node that is known to be compromisable by the attacker at the current time.

17. The method of claim 1, wherein, in response to the determining that the network node is compromisable by using the first attack method and until the determining that the time elapsed between the time of determining that the network node is compromisable by using the first attack method and the current time exceeds the respective time value assigned to the network node, the network node is shown on a second display device as a network node that is in a state that is different from both (i) the state of network nodes that are not known to be compromisable by the attacker at the current time, and (ii) the state of network nodes that are known to be compromisable by the attacker at the current time.

18. The method of claim 1, wherein (i) the first and second determined ways for the attacker to compromise the networked system differ only in that the first determined way uses the first attack method for compromising the network node and the second determined way uses the second attack method for compromising the network node, and (ii) the reporting of the first and second determined ways for the attacker to compromise the networked system includes causing the display device to display the first and second determined ways as two separate ways to compromise the networked system.

19. The method of claim 1, wherein (i) the first and second determined ways for the attacker to compromise the networked system differ only in that the first determined way uses the first attack method for compromising the network node and the second determined way uses the second attack method for compromising the network node, and (ii) the reporting of the first and second determined ways for the attacker to compromise the networked system includes causing the display device to display the first and second determined ways as a single way for the attacker to compromise the networked system, where the displayed single way to compromise the networked system uses a single attack method that is one of the first and second attack methods for compromising the network node, the displaying of the single attack method indicating there is at least one other attack method that may be used for compromising the network node.

20. The method of claim 1, further comprising:
  i. providing remediation recommendations for the networked system, the remediation recommendations including recommendations for: (i) blocking the first attack method from compromising the network node, and (ii) blocking the second attack method from compromising the network node.

21. A penetration testing system for carrying out penetration testing of a networked system to determine one or more ways for an attacker to compromise the networked system, wherein the penetration testing system is configured to assign network nodes of the networked system to disjoint classes based on current information about the compromisability of the network nodes, the classes consisting of (i) a first class, wherein each network node that is a member of the first class at the current time is not currently known to be compromisable by the attacker, (ii) a second class, wherein each given network node that is a member of the second class at the current time is currently known to be compromisable by the attacker, and wherein the elapsed time between the time of determining that the given network node is compromisable and the current time is less than or equal to a respective time value, and (iii) a third class, wherein each given network node that is a member of the third class at the current time is currently known to be compromisable by the attacker, and wherein the elapsed time between the time of determining that the given network node is compromisable and the current time is more than a respective time value, the penetration testing system comprising:
  a. a computing device comprising one or more processors, the computing device in networked communication with multiple network nodes of the networked system; and
  b. a non-transitory computer-readable storage medium containing program instructions, wherein execution of the program instructions by the one or more processors of the computing device causes the one or more processors of the computing device to carry out the following steps:
    i. selecting a network node from the nodes of the networked system to be a next target network node, wherein the network node is a member of the first class;
    ii. determining that the network node is compromisable by the attacker by using a first attack method;

iii. in response to the determining that the network node is compromisable by using the first attack method:
   A. changing the assignment of the network node from the first class to the second class; and
   B. assigning a respective time value to the network node;
iv. subsequent to the determining that the network node is compromisable by using the first attack method and while the elapsed time between the time of determining that the network node is compromisable by using the first attack method and the current time is less than or equal to the respective time value assigned to the network node, performing the following:
   A. selecting the network node to be a next target network node a second time; and
   B. determining that the network node is compromisable by the attacker by using a second attack method, different from the first attack method;
v. in response to determining that the elapsed time between the time of determining that the network node is compromisable by using the first attack method and the current time exceeds the respective time value assigned to the network node, changing the assignment of the network node from the second class to the third class, thereby disabling additional selection of the network node to be a next target network node;
vi. determining a first way for the attacker to compromise the networked system, wherein the first way for the attacker to compromise the networked system includes a step of compromising the network node using the first attack method;
vii. determining a second way for the attacker to compromise the networked system, wherein the second way for the attacker to compromise the networked system includes a step of compromising the network node using the second attack method; and
viii. reporting the first and second determined ways for the attacker to compromise the networked system, the reporting comprising at least one action selected from the actions group consisting of (i) causing a display device to display a report including information about the determined first and second ways to compromise the networked system, (ii) recording the report including the information about the determined first and second ways to compromise the networked system in a file, and (iii) electronically transmitting the report including the information about the determined first and second ways to compromise the networked system.

* * * * *